US012634924B2

(12) United States Patent
Kazmi et al.

(10) Patent No.: US 12,634,924 B2
(45) Date of Patent: May 19, 2026

(54) SYSTEMS AND METHODS FOR SCHEDULING IN A TDD SYSTEM BASED ON UE SPECIFIC DL-UL GAP REQUIREMENTS

(71) Applicant: Telefonaktiebolaget LM Ericsson (publ), Stockholm (SE)

(72) Inventors: Zaigham Kazmi, Austin, TX (US); Olav Queseth, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 454 days.

(21) Appl. No.: 18/038,814

(22) PCT Filed: Nov. 29, 2021

(86) PCT No.: PCT/IB2021/061084
§ 371 (c)(1),
(2) Date: May 25, 2023

(87) PCT Pub. No.: WO2022/113041
PCT Pub. Date: Jun. 2, 2022

(65) Prior Publication Data
US 2023/0422238 A1     Dec. 28, 2023

Related U.S. Application Data

(60) Provisional application No. 63/118,820, filed on Nov. 27, 2020.

(51) Int. Cl.
*H04W 72/1263* (2023.01)
*H04L 5/14* (2006.01)
*H04W 72/566* (2023.01)

(52) U.S. Cl.
CPC ....... *H04W 72/1263* (2013.01); *H04L 5/1469* (2013.01); *H04W 72/566* (2023.01)

(58) Field of Classification Search
CPC ........... H04W 72/1263; H04W 72/566; H04W 56/0005; H04W 72/54; H04W 56/003; H04L 5/1469; H04B 7/2643; H04B 7/2671
See application file for complete search history.

(56) References Cited

U.S. PATENT DOCUMENTS 9,749,120 B2 * 8/2017 Siomina ................ H04L 5/0048
10,122,521 B2 * 11/2018 Ziren ................ H04W 56/0065
(Continued)

FOREIGN PATENT DOCUMENTS

WO     2016179777 A1   11/2016

OTHER PUBLICATIONS

Sesia, et al., "LTE: The UMTS Long Term Evolution From Theory to Practice," Reference Pages, Chapter 12.3, 2011, 8 pages.
(Continued)

*Primary Examiner* — Habte Mered
(74) *Attorney, Agent, or Firm* — Withrow & Terranova, PLLC

(57) ABSTRACT

Systems and methods for scheduling downlink and/or uplink transmissions to wireless communication devices in a Time Division Duplexing (TDD) system that take into account downlink-to-uplink gap requirements of the wireless communication devices are disclosed. In one embodiment, a method performed by a network node for scheduling downlink and/or uplink transmissions to a plurality of wireless communication devices in a TDD system comprises obtaining path delay requirements (e.g., timing advance requirements) of a plurality of wireless communication devices, determining downlink-to-uplink gap requirements of the plurality of wireless communication devices based on the path delay requirements of the plurality of wireless communication devices, and performing scheduling for the
(Continued)

PERFORM BASELINE SCHEDULING PROCEDURE
500

ANY UE THAT REQUIRE ADDITIONAL DL-UL GAP? 502 — NO → END

↓ YES

COMPUTE GAP WEIGHT FACTORS FOR RESPECTIVE UEs
504

COMPUTE NEW SCHEDULING PRIORITIES FOR UEs BASED ON INITIAL PRIORITIES FROM THE BASELINE SCHEDULING PROCEDURE AND THE RESPECTIVE GAP WEIGHTS
506

REASSIGN TRANSMISSION RESOURCES BASED ON THE NEW SCHEDULING PRIORITIES
508 plurality of wireless communication devices based on the downlink-to-uplink gap requirements of the plurality of wireless communication devices.

15 Claims, 17 Drawing Sheets

(56)                    References Cited

U.S. PATENT DOCUMENTS

| | | | | |
|---|---|---|---|---|
| 10,455,603 | B2 | 10/2019 | Hosseini et al. | |
| 2018/0139752 | A1* | 5/2018 | Wang | H04B 7/2643 |
| 2019/0215805 | A1* | 7/2019 | Sahlin | H04W 72/23 |
| 2019/0372740 | A1 | 12/2019 | Seol et al. | |
| 2020/0196326 | A1 | 6/2020 | Li et al. | |
| 2020/0205195 | A1* | 6/2020 | Sun | H04W 74/0808 |
| 2022/0078813 | A1* | 3/2022 | Miao | H04W 36/0088 |
| 2023/0309041 | A1* | 9/2023 | Dai | H04B 7/1853 |
| 2024/0298345 | A1* | 9/2024 | Wilkinson | H04W 72/542 |
| 2024/0323970 | A1* | 9/2024 | Noh | H04L 5/0044 |
| 2025/0185012 | A1* | 6/2025 | Cho | H04B 7/0456 |
| 2025/0240782 | A1* | 7/2025 | Yang | H04L 25/0226 |

OTHER PUBLICATIONS

International Search Report and Written Opinion for International Patent Application No. PCT/IB2021/061084, mailed Feb. 16, 2022, 9 pages.

* cited by examiner

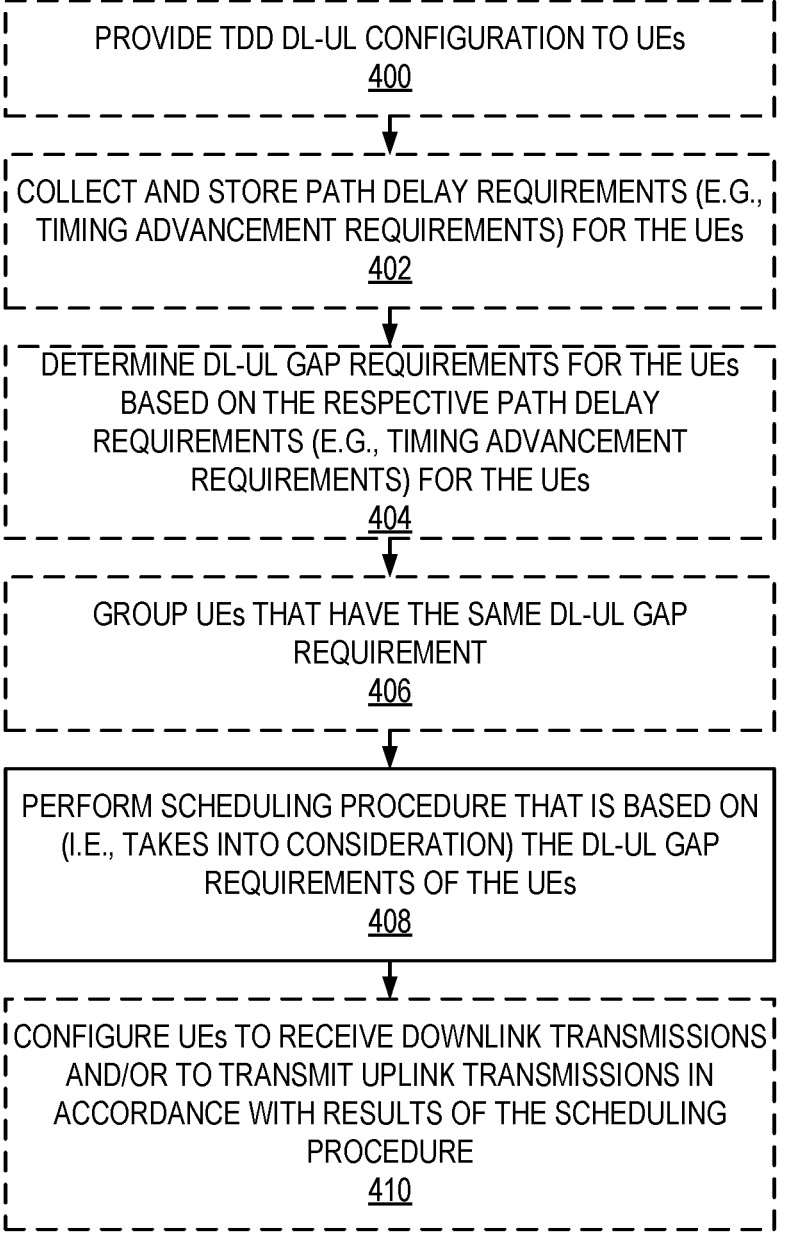

PROVIDE TDD DL-UL CONFIGURATION TO UEs
400

COLLECT AND STORE PATH DELAY REQUIREMENTS (E.G.,
TIMING ADVANCEMENT REQUIREMENTS) FOR THE UEs
402

DETERMINE DL-UL GAP REQUIREMENTS FOR THE UEs
BASED ON THE RESPECTIVE PATH DELAY
REQUIREMENTS (E.G., TIMING ADVANCEMENT
REQUIREMENTS) FOR THE UEs
404

GROUP UEs THAT HAVE THE SAME DL-UL GAP
REQUIREMENT
406

PERFORM SCHEDULING PROCEDURE THAT IS BASED ON
(I.E., TAKES INTO CONSIDERATION) THE DL-UL GAP
REQUIREMENTS OF THE UEs
408

CONFIGURE UEs TO RECEIVE DOWNLINK TRANSMISSIONS
AND/OR TO TRANSMIT UPLINK TRANSMISSIONS IN
ACCORDANCE WITH RESULTS OF THE SCHEDULING
PROCEDURE
410

*FIG. 4*

SYSTEMS AND METHODS FOR SCHEDULING IN A TDD SYSTEM BASED ON UE SPECIFIC DL-UL GAP REQUIREMENTS

RELATED APPLICATIONS

This application is a 35 U.S.C. § 371 national phase filing of International Application No. PCT/IB2021/061084, filed Nov. 29, 2021, which claims the benefit of provisional patent application Ser. No. 63/118,820, filed Nov. 27, 2020, the disclosures of which are hereby incorporated herein by reference in their entireties.

TECHNICAL FIELD

The present disclosure relates to scheduling in a Time Division Duplexing (TDD) system.

BACKGROUND

In cellular wireless communication such as Third Generation Partnership Project (3GPP) Long Term Evolution (LTE) and New Radio (NR), a User Equipment (UE) is scheduled by the Radio Access Network (RAN) for both uplink and downlink data transmission. A number of different scheduling algorithms exist with different goals such as, e.g., to maximize cell throughput, to meet UEs' guaranteed throughput, to optimize overall throughput, etc. These scheduling algorithms take into account different parameters such as, e.g., UEs' Signal to Interference plus Noise Ratio (SINR), UEs' Quality of Service (QoS) requirements, cell bandwidth, etc.

In addition to scheduling decisions, UE transmission timing for uplink is controlled by the RAN so that the data from all UEs for a given slot or symbol arrive at the same time irrespective of their respective distances from the receiver antenna of the RAN node (e.g., eNodeB (eNB) for LTE/next generation NodeB (gNodeB) for NR). This means UEs at different distances from the RAN node start their uplink transmissions for the same slot/symbol at different times. In Time Division Duplexing (TDD), this requires a gap between downlink and uplink transmission as UEs can start uplink only after having received downlink data. The time duration of the gap depends on the distance of the UE from the RAN node. Currently, this gap is configured based on cell range and is fixed for all UEs. The gap results in loss of overall throughput as no data is transmitted (downlink or uplink) in these symbols, as illustrated in FIG. 1.

There are many different classes of scheduling algorithms available in the public domain. These classes of scheduling algorithms include, e.g.:

1. Round Robin Algorithm: A round robin scheduling algorithm is one that simply schedules UEs in a round robin fashion without considering any other factor. No explicit attempt to either maximize or optimize either UE throughput or cell throughput is made.
2. Greedy Algorithm: A greedy algorithm is one that tries to maximize overall cell throughput. UEs that have bad SINR could be starved for a long period of time.
3. Fair Scheduling: A fair scheduling algorithm is one that tries to be fair to all UEs. Overall cell throughput is not optimal in a fair scheduling algorithm.
4. Proportionally Fair Scheduling: A proportionally fair scheduling algorithm is one that attempts to optimize both cell throughput as well as the throughput of the UEs.

5. QoS Aware Proportionally Fair Scheduling: A QoS aware proportionally fair scheduling algorithm is one that is a variant of proportionally fair scheduling that takes into account the QoS requirement for each UE.
6. Interference Management Scheduling: An interference management scheduling algorithm is a newer class of scheduling algorithms that also take into account the interference to neighboring cells and attempts to minimize the interference.

There are many other scheduling algorithms as well, each with a different focus, e.g. real time traffic, Voice over Internet Protocol (VoIP), gaming, etc. None of these algorithms consider the TDD gap requirement in their scheduling decision and thus these resources are wasted.

Some existing technology that may be considered pertinent to the problem and solution described herein are as follows. U.S. Pat. No. 10,455,603B2 (hereinafter "the '603 patent") relates to wireless transmission timing based on timing advance values in shortened Transmission Time Interval (sTTI) transmissions. The '603 patent is specific to a sTTI. Further, parameters mentioned in the '603 patent use Hybrid Automatic Repeat Request (HARQ) feedback but not scheduling decision. United States Patent Application Publication Number 2019/0372740 A1 (hereinafter "the '740 application") teaches an apparatus and method for controlling inter-cell interference in a TDD based wireless communication system. The solution described in the '740 application adjusts downlink/uplink transmission resources according to buffer status and for controlling inter-cell interference. It does not consider timing advance. It does not use timing advance as input for scheduling decision. United States Patent Application Publication Number 2020/0196326 A1 (hereinafter "the '326 application") teaches systems and methods for robust Time Division Multiplex (TDM) patterns. The solution described in the '326 application uses TDM for spectrum sharing (NR-LTE). The solution described in the '326 application uses priority rules for determining TDM pattern. The solution described in the '326 application is not related to scheduling decision explicitly and does not use timing advance as input.

SUMMARY

Systems and methods for scheduling downlink and/or uplink transmissions to wireless communication devices in a Time Division Duplexing (TDD) system that take into account downlink-to-uplink gap requirements of the wireless communication devices are disclosed. In one embodiment, a method performed by a network node for scheduling downlink and/or uplink transmissions to a plurality of wireless communication devices in a TDD system comprises obtaining path delay requirements (e.g., timing advance requirements) of a plurality of wireless communication devices, determining downlink-to-uplink gap requirements of the plurality of wireless communication devices based on the path delay requirements of the plurality of wireless communication devices, and performing scheduling for the plurality of wireless communication devices based on the downlink-to-uplink gap requirements of the plurality of wireless communication devices.

In one embodiment, performing scheduling for the plurality of wireless communication devices based on the downlink-to-uplink gap requirements of the plurality of wireless communication devices comprises performing scheduling for the plurality of wireless communication devices based on the downlink-to-uplink gap requirements of the plurality of wireless communication devices such that the downlink-to-uplink gap requirements of the plurality of wireless communication devices are satisfied.

In one embodiment, performing scheduling for the plurality of wireless communication devices based on the downlink-to-uplink gap requirements of the plurality of wireless communication devices comprises assigning transmission resources that fall between downlink transmissions resources assigned for a particular wireless communication device and uplink transmission resources assigned for the particular wireless communication device for downlink transmission to or uplink transmission from another wireless communication device.

In one embodiment, performing scheduling for the plurality of wireless communication devices based on the downlink-to-uplink gap requirements of the plurality of wireless communication devices comprises performing a baseline scheduling procedure that assigns transmission resources and scheduling priorities to a subset of the plurality of wireless communication devices and, for each wireless communication device from among at least one of the subset of the plurality of wireless communication devices, computing a gap weight factor for the wireless communication device based on the downlink-to-uplink requirement of the wireless communication device and computing a new scheduling priority for the wireless communication device based on the scheduling priority assigned to the wireless communication device by the baseline scheduling procedure and the gap weight factor computed for the wireless communication device. Performing scheduling for the plurality of wireless communication devices based on the downlink-to-uplink gap requirements of the plurality of wireless communication devices further comprises reassigning transmission resources based on the new scheduling priority computed for the at least one of the subset of the plurality of wireless communication devices.

In one embodiment, computing the gap weight factor for the wireless communication device comprises determining that that the wireless communication device has only uplink data and no downlink data and setting the gap weight factor to null responsive to determining that that the wireless communication device has only uplink data and no downlink data.

In one embodiment, computing the gap weight factor for the wireless communication device comprises determining that that the wireless communication device has only downlink data and no uplink data and that the downlink-to-uplink gap requirement of the wireless communication device does not exceed a minimum number of symbols needed between downlink transmission and Hybrid Automatic Repeat Request (HARQ) feedback and setting the gap weight factor to null responsive to determining that that the wireless communication device has only downlink data and no uplink data and that the downlink-to-uplink gap requirement of the wireless communication device does not exceed the minimum number of symbols needed between downlink transmission and HARQ feedback.

In one embodiment, computing the gap weight factor for the wireless communication device comprises determining that that the wireless communication device has both downlink data and uplink, determining that a scheduled gap between downlink transmission resources and uplink transmission resources assigned to the wireless communication device by the baseline scheduling procedure is greater than the downlink-to-uplink gap requirement of the wireless communication device, and setting the gap weight factor to null responsive to determining that that the wireless communication device has both downlink data and uplink and determining that the scheduled gap between downlink transmission resources and uplink transmission resources assigned to the wireless communication device by the baseline scheduling procedure is greater than the downlink-to-uplink gap requirement of the wireless communication device.

In one embodiment, computing the gap weight factor for the wireless communication device comprises determining that that the wireless communication device has both downlink data and uplink data, determining that a scheduled gap between downlink transmission resources and uplink transmission resources assigned to the wireless communication device by the baseline scheduling procedure is not greater than the downlink-to-uplink gap requirement of the wireless communication device, and assigning a negative gap weight factor as the gap weight factor of the wireless communication device responsive to determining that that the wireless communication device has both downlink data and uplink data and determining that the scheduled gap between downlink transmission resources and uplink transmission resources assigned to the wireless communication device by the baseline scheduling procedure is not greater than the downlink-to-uplink gap requirement of the wireless communication device. In one embodiment, the negative gap weight factor is relative to the downlink-to-uplink gap requirement of the wireless communication device. In another embodiment, the negative gap weight factor is a fixed value. In one embodiment, the negative gap weight value is applicable to both downlink and uplink transmission for the wireless communication device. In another embodiment, the negative gap weight value is applicable to downlink transmission but not uplink transmission for the wireless communication device. In another embodiment, the negative gap weight value is applicable to uplink transmission but not downlink transmission for the wireless communication device.

In one embodiment, performing scheduling for the plurality of wireless communication devices based on the downlink-to-uplink gap requirements of the plurality of wireless communication devices comprises performing scheduling for the plurality of wireless communication devices such that the downlink-to-uplink gap requirements of the plurality of wireless communication devices are taken into consideration for scheduling of uplink transmissions but not downlink transmissions.

In one embodiment, performing scheduling for the plurality of wireless communication devices based on the downlink-to-uplink gap requirements of the plurality of wireless communication devices comprises performing scheduling for the plurality of wireless communication devices such that the downlink-to-uplink gap requirements of the plurality of wireless communication devices are taken into consideration for scheduling of downlink transmissions but not uplink transmissions.

Corresponding embodiments of a network node are also disclosed. In one embodiment, a network node for scheduling downlink and/or uplink transmissions to a plurality of wireless communication devices in a TDD system is adapted to obtain path delay requirements (e.g., timing advance requirements) of a plurality of wireless communication devices, determine downlink-to-uplink gap requirements of the plurality of wireless communication devices based on the path delay requirements of the plurality of wireless communication devices, and perform scheduling for the plurality of wireless communication devices based on the downlink-to-uplink gap requirements of the plurality of wireless communication devices.

In one embodiment, a network node for scheduling downlink and/or uplink transmissions to a plurality of wireless communication devices in a TDD system comprises processing circuitry configured to cause the network node to obtain path delay requirements (e.g., timing advance requirements) of a plurality of wireless communication devices, determine downlink-to-uplink gap requirements of the plurality of wireless communication devices based on the path delay requirements of the plurality of wireless communication devices, and perform scheduling for the plurality of wireless communication devices based on the downlink-to-uplink gap requirements of the plurality of wireless communication devices.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 4 is a flow chart that illustrates the operation of a base station in accordance with an embodiment of the present disclosure;

DETAILED DESCRIPTION

Figure 1:
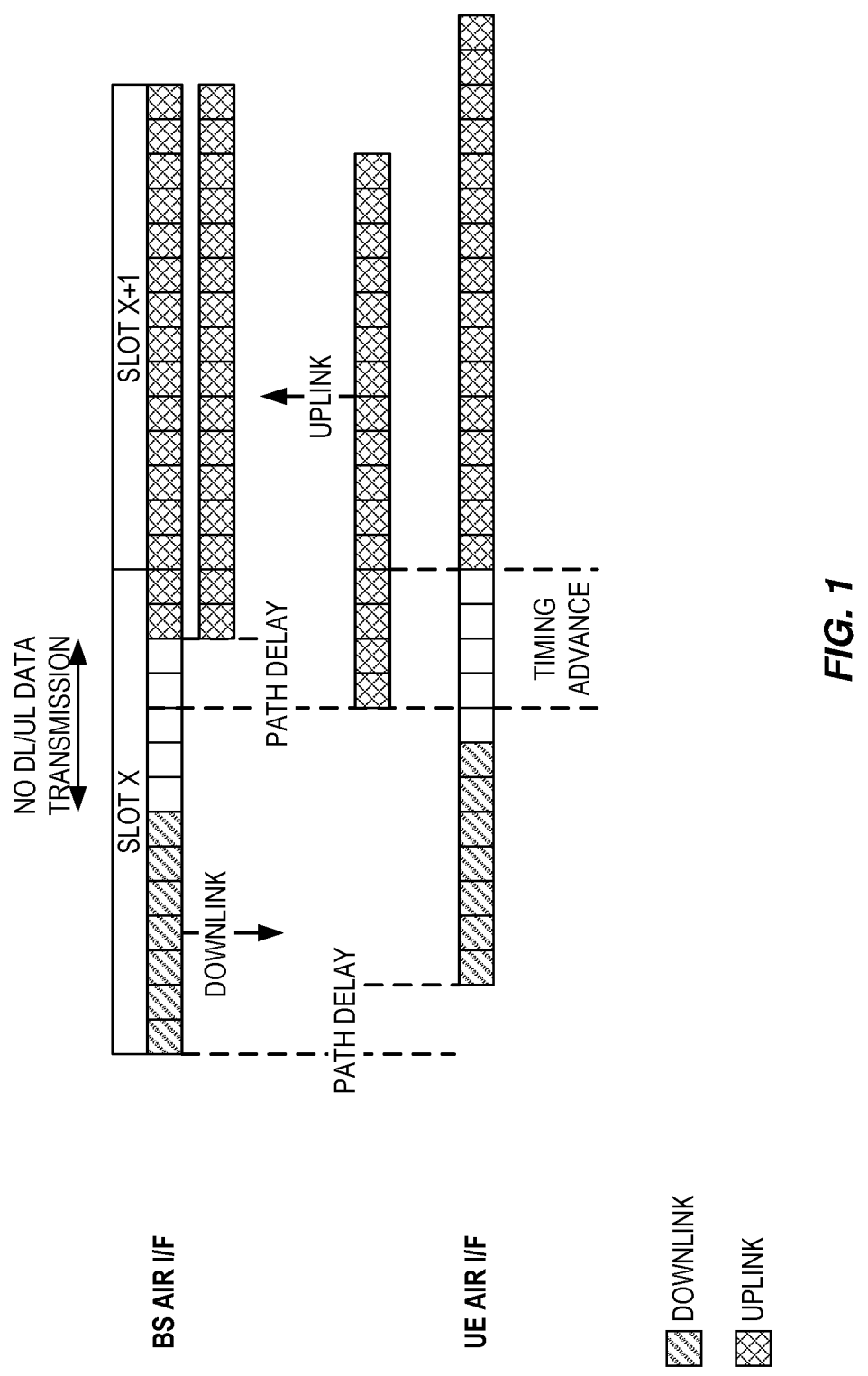
FIG. 1 illustrates an example of loss of overall throughput because no data is transmitted (downlink or uplink) in symbols within a Downlink to Uplink (DL-UL) gap of a User Equipment (UE) in a Time Division Duplexing (TDD) system.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

There currently exist certain challenge(s) with existing scheduling algorithms. One problem with existing scheduling algorithms is that none of these algorithms take into account and use the gap between downlink and uplink transmission resources and thus these resources are wasted. For example:

The solution described in the '740 application adjusts downlink/uplink transmission resources according to buffer status and for controlling inter-cell interference. It does not consider timing advance and does not attempt to utilize the gaps between downlink and uplink transmission resources.

The solution described in the '326 application uses priority rules for selecting the Time Division Multiplexing (TDM) pattern, but does not attempt to utilize the gaps between downlink and uplink transmission resources.

Certain aspects of the present disclosure and their embodiments may provide solutions to the aforementioned or other challenges. Systems and methods are disclosed herein that relate to a scheduler that takes into account gap requirements for different UEs when making scheduling decisions. In one embodiment, a network node (e.g., a RAN node such as e.g., a base station) that implements a scheduler obtains a Downlink to Uplink (DL-UL) gap requirement for a UE, which is also referred to herein as a UE specific gap requirement. In one embodiment, the network node uses an estimated Time of Arrival (ToA) (e.g., of a signal (e.g., random access preamble) from the UE at the network node) or Timing Advance (e.g., timing advance indicated by timing advance command sent from the network node to the UE) to determine the UE specific gap requirement for the UE. In other words, the UE specific gap requirement for the UE is based on path delay from the UE to the network node. The network node, and in particular the scheduler, uses the UE specific gap requirement as a factor in its scheduling decision.

In one embodiment, $Ng_i$ is number of gap symbols needed for $UE_i$ (i.e., the UE specific gap requirement for $UE_i$ is $Ng_i$ symbols). The scheduled gap Si is the number of symbols between the downlink data from the base station for $UE_i$ and the symbol where the base station is expected to receive uplink control information (e.g., Physical Uplink Control Channel (PUCCH)) or data (e.g., Physical Uplink Shared Channel (PUSCH)) from $UE_i$. When making a scheduling decision, the base station attempts to avoid scheduling uplink transmission resources adjacent to scheduled downlink transmission resources for $UE_i$. The base station looks at gap requirements for all UEs and schedules them such that the gap requirements are met for all UEs. That is $Ng_i \leq Si$ for all UEs. The base station assigns transmission resources that fall between the downlink transmission resources and uplink transmission resources assigned to $UE_i$ to another UE instead of reserving them as gap symbols. With this approach, a majority of transmission resources can be used for actual data transmission and throughput gets closer to the maximum achievable throughput without gaps and is consistent across cells with different cell ranges.

Figure 2:
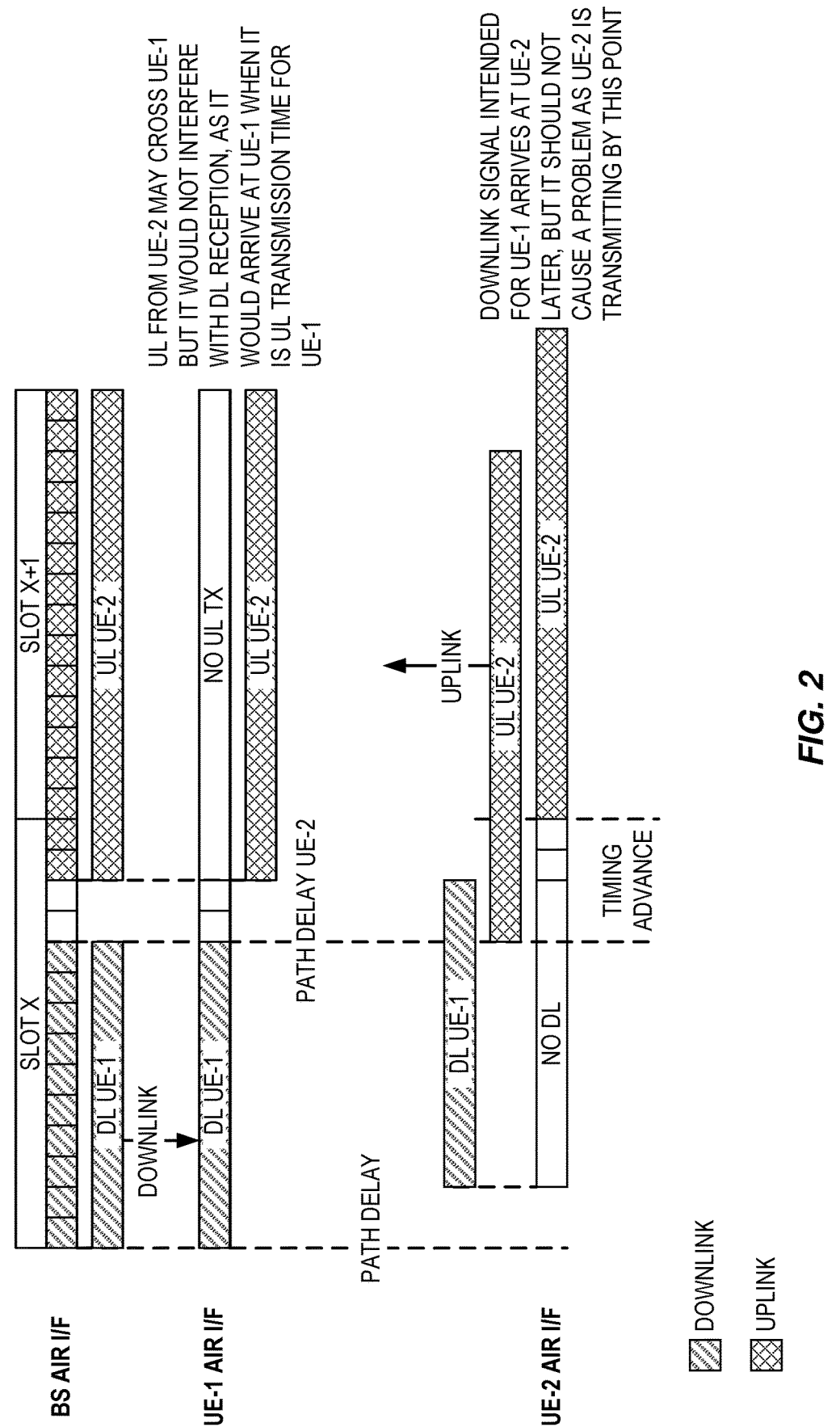
FIG. 2 illustrates the use of transmission resources that fall between downlink transmission resources and uplink transmission resources for a first UE to schedule an uplink transmission for a second UE in accordance with an embodiment of the present disclosure.

As example is illustrated in FIG. 2 which shows the use of transmission resources that fall between downlink transmission resources and uplink transmission resources for UE-1 to schedule an uplink transmission for UE-2. In this example, UE-1 is very close to the base station and as such the associated path delay is shown as being negligible.

In embodiments of the present disclosure, UE specific downlink-uplink gap requirements are used in scheduling decisions to minimize the downlink-uplink gaps at the air interface of RAN.

Certain embodiments may provide one or more of the following technical advantage(s). Embodiments of the present disclosure increase cell throughput. Cell throughput can reach the maximum throughput for cells configured as large cells. For example, consider a Frequency Range 2 (FR2) cell (subcarrier spacing (SCS) equal to 120 kilohertz (kHz)) of 7 kilometer (km) cell range that uses Ericsson's TDD 4:1 pattern. A 7 km cell requires seven symbol gaps between downlink and uplink symbols. In a 20 millisecond (ms) radio frame:

# of Physical Downlink Shared Channel (PDSCH) symbols=1502 # of gap symbols=224

Throughput lost due to gap symbols=(224/1502)*100=14.92%

If all gap symbols can be removed, it would result in ~15% downlink throughput improvement. The throughput improvement increases as the cell range increases as larger cells require more DL-UL gap.

Figure 3:
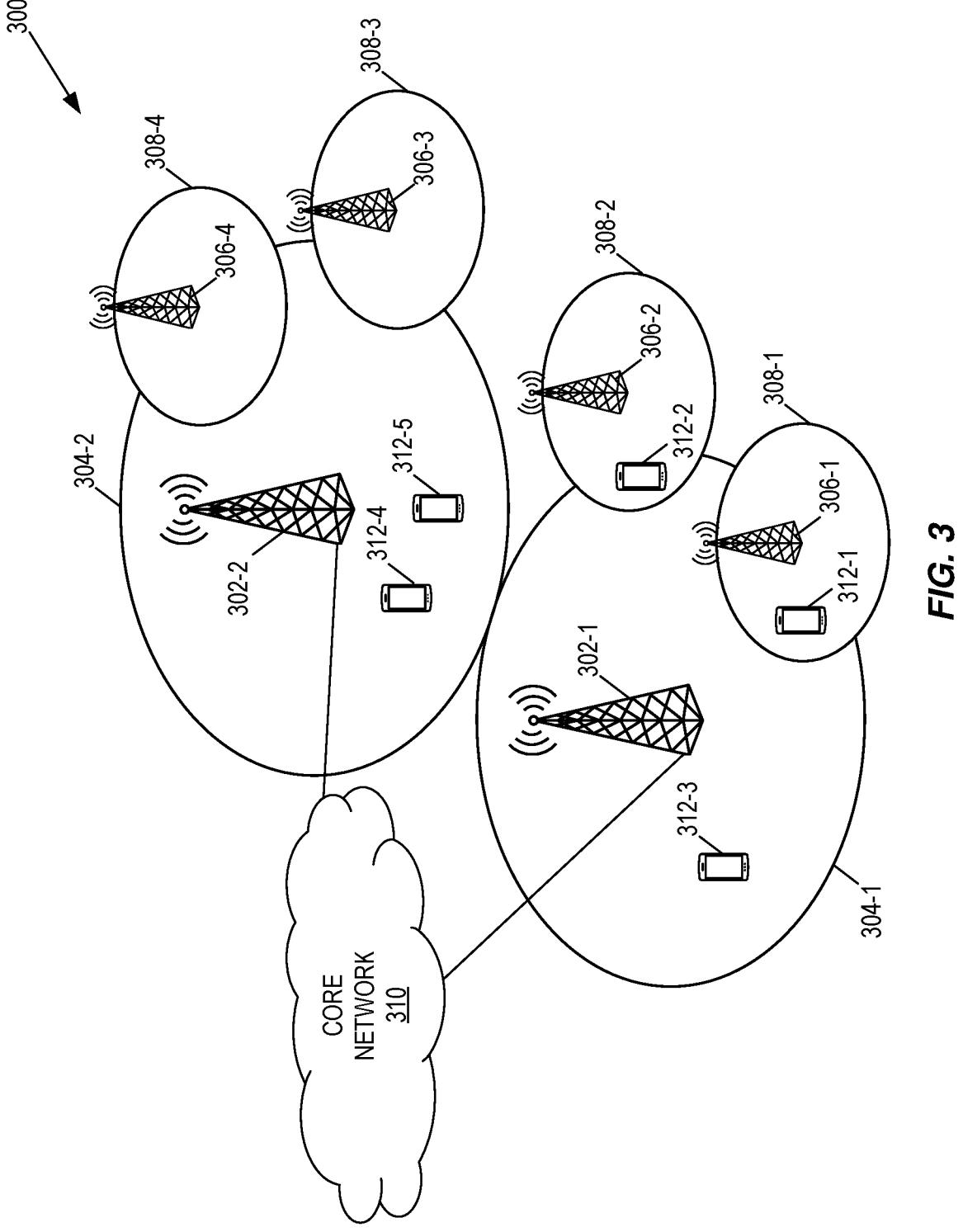
FIG. 3 illustrates one example of a cellular communications system in which embodiments of the present disclosure may be implemented.

FIG. 3 illustrates one example of a cellular communications system 300 in which embodiments of the present disclosure may be implemented. In the embodiments described herein, the cellular communications system 300 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC); however, the present disclosure is not limited thereto. In this example, the RAN includes base stations 302-1 and 302-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5GC and in the EPS is referred to as the EPC. The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes UEs and as such sometimes referred to herein as UEs 312, but the present disclosure is not limited thereto.

Now, the discussion will turn to embodiments of a scheduling procedure performed by a scheduler implemented at a network node such as, e.g., a RAN node. One such RAN node is the base station 302. Thus, for the discussion below, the scheduling procedure is described as being performed by the base station 302 and, more specifically, by a scheduler of the base station 302. The scheduler may be implemented in software that is executed by one or more processors (e.g., one or more CPU(s), ASIC(s), FPGA(s), and/or the like) of the base station 302. In one particular embodiment, the scheduler may be implemented in a baseband unit of the base station 302. Note, however, that the scheduling procedure may be performed by any network node that operates to provide scheduling or make scheduling decisions for one or more cells in the RAN.

In the description below:

A "transmission resource" refers to a frequency-time domain resource consisting of one Physical Resource Block (PRB) in one Orthogonal Frequency Division Multiplexing (OFDM) symbol used for data transmission.

The word "gap" refers to gap or distance between a downlink symbol and adjacent uplink symbol in a Time Division Duplexing (TDD) system. From the base station (e.g., gNB for NR) perspective, neither a downlink transmission nor an uplink reception for a UE is possible during the gap. From the UE perspective, the timing advance command may cause the uplink transmission to start in the gap window (see, e.g., FIG. 1).

The word "add" implies an operation that will affect the overall priority as intended. It could be a mathematical addition or multiplication or some other operation.

The word "negative" implies a value that will lower the overall priority as intended.

If "add" is implemented as mathematical addition, "negative" would imply a negative number.

If "add" is implemented as mathematical multiplication, "negative" would imply a fraction that is between 0 and 1.

A "NULL" Gap-Weight factor has no effect on the scheduling priority of a UE. For example, if "add" is implemented as mathematical addition, the "NULL" can be implemented as number zero (0). On the other hand, if "add" is implemented as mathematical multiplication, the "NULL" can be implemented as number one (1)

The term "Baseline Scheduling Procedure" refers to an initial scheduling procedure used to schedule UEs 312 for uplink and/or downlink transmission. The baseline scheduling procedure may be a scheduling procedure that uses any of the types, or classes, of scheduling algorithms described above (e.g., round robin, greedy, etc.).

"Procedure-End" is a condition that will stop the execution of the scheduling procedure. It could be number of iterations, number of UEs considered, or any other such condition.

The scheduling procedure could be implemented in other ways as well and the words "add" and "negative" should be interpreted within the context of the implementation with the following understanding:

a "negative" number "added" to priority will lower the priority, and a larger "negative" number "added" to priority will lower the priority more than a smaller "negative" number "added" to the priority.

FIG. 4 illustrates the operation of the base station 302 in accordance with an embodiment of the present disclosure. Optional steps are represented by dashed lines/boxes. As illustrated, the base station 302 provides a TDD DL-UL Configuration (e.g., TDD-UL-DL-ConfigCommon and/or TDD-UL-DL-ConfigDedicated in 3GPP LTE/NR) to UEs 312, where the base station 302 configures N or more symbols as flexible symbols between downlink and uplink transmission resources where N is the maximum DL-UL gap requirements based on the cell range (step 400). The base station 302 (e.g., a baseband unit of the base station 302) collects and stores a path delay requirement (e.g., a timing advancement requirement) for each connected UE 312 (step 402). The base station 302 (e.g., the baseband unit of the base station 302) further determines DL-UL gap requirements for the UEs 312 (also referred to herein as UE specific gap requirements) based on the path delay (e.g., timing advancement requirements) (e.g., of the respective UEs 312) (step 404). Note that for much of the discussion herein, the path delay requirement of each of the UEs 312 is the timing advancement requirement of the UE 312. The determined DL-UL gap requirement for each UE 312 determined as, in one embodiment, the round trip time (as determined from the path delay or timing advancement requirement of the UE 312) between the base station 302 and the UE 312 plus a (e.g., predefined) margin for switching from downlink to uplink. The base station 302 (e.g., the baseband unit of the base station 302) may group UEs 312 that have the same UE specific gap requirements (step 406). The base station 302 (e.g., the baseband unit of the base station 302) then performs a scheduling procedure to schedule one or more UEs 312 for downlink and/or uplink transmission based on the determined DL-UL gap requirements of the UEs 312 (step 408). The base station 302 then configures the scheduled UEs 312 for downlink reception and/or uplink transmission in accordance with results of the scheduling procedure (step 410).

Figure 5:
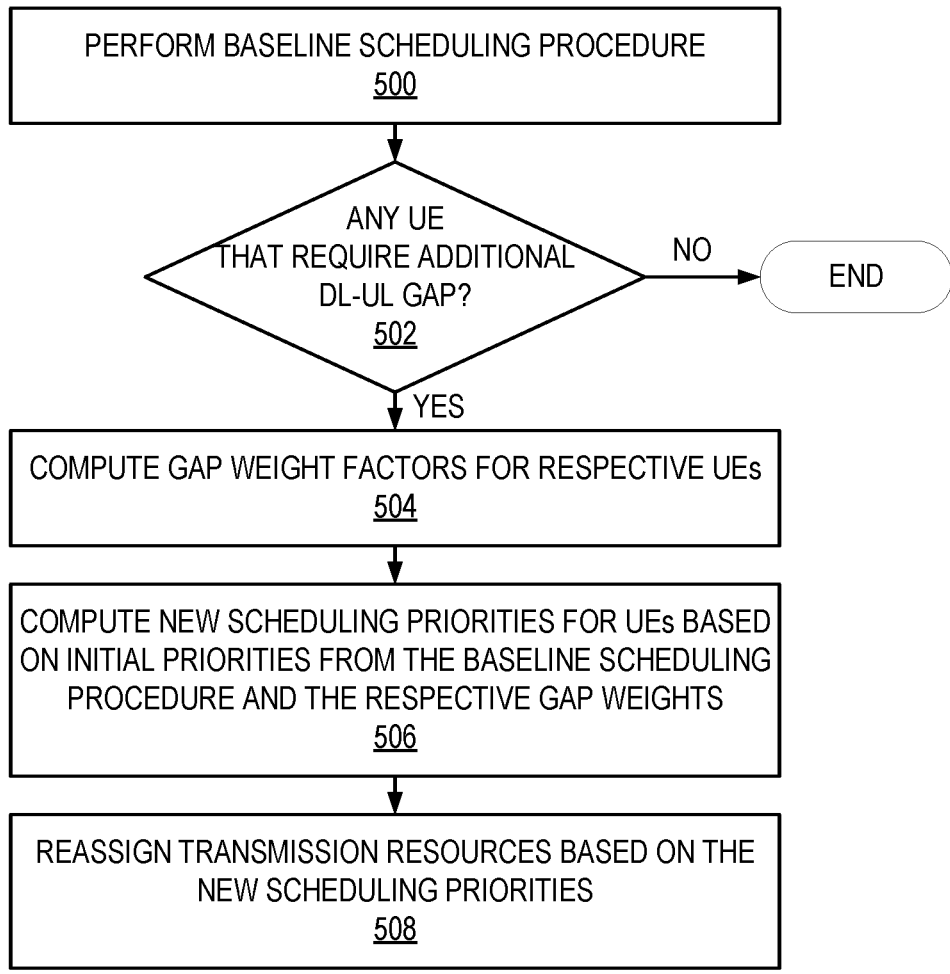
FIG. 5 is a flow chart that illustrates the process of step 408 of FIG. 4 in more detail, in accordance with an embodiment of the present disclosure.

FIG. 5 is a flow chart that illustrates the process of step 408 in more detail, in accordance with an embodiment of the present disclosure. In one embodiment, this procedure is performed by the scheduler of the base station 302, which may be implemented in a baseband unit of the base station 302. As illustrated, the base station 302 first performs a baseline scheduling procedure to assign transmission resources to UEs 312 with pending data on downlink, uplink, or both directions (step 500). The base station 302 determines whether any UE 312 scheduled by the baseline scheduling procedure requires a DL-UL gap between assigned downlink transmission resources and assigned uplink transmission resources (step 502). If not, the scheduling procedure ends. Otherwise, the base station 302 then allocates each UE 312 (e.g., each UE that requires additional DL-UL gap) a weight factor, which is henceforth called a Gap-Weight factor, based on the DL-UL gap requirement for that UE 312 and the gap between the assigned downlink and the assigned uplink transmission resources (step 504). The gap between the assigned downlink resources and the assigned uplink resources is referred to herein as the scheduled gap. For each UE 312, the Gap-Weight factor of that UE 312 is then used by the base station 302 (e.g., the scheduler) to calculate a new priority for each of the respective UEs 312 (step 506). These new priorities are the final scheduling priorities for the respective UEs. The Gap-Weight factor adds to the overall priority metric of the UE's scheduling. The base station 302 then re-assigns transmission resources based on the new priorities computed for the UEs 312 (step 508).

Figure 6:
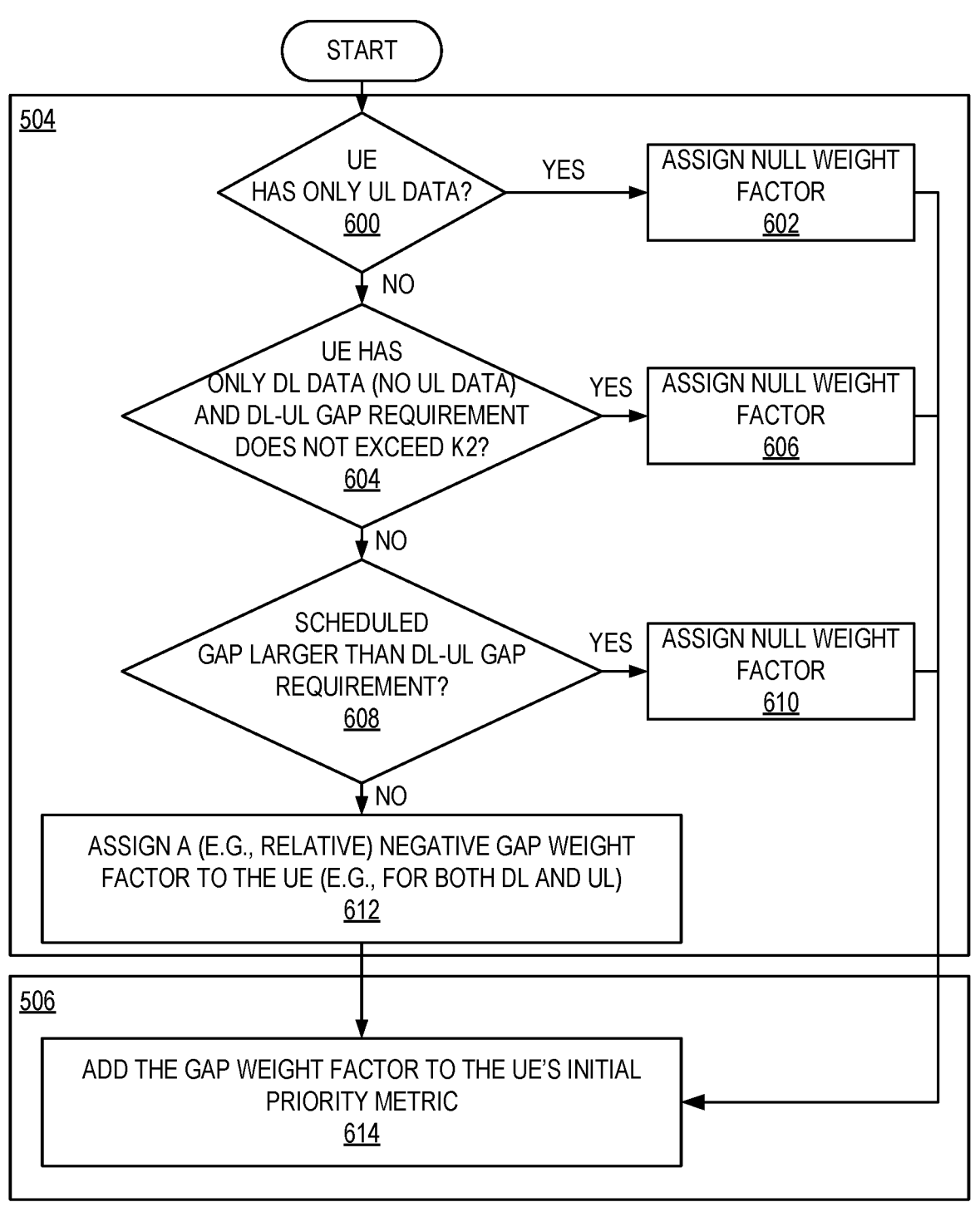
FIG. 6 illustrates the operation of the base station when computing scheduling priority for multiple UEs for a given set of transmission resources to compute and apply respective Gap-Weight factors in accordance with an embodiment of the present disclosure.

When computing scheduling priority for multiple UEs 312 for a given set of transmission resources, the base station 302, and more specifically the scheduler, takes the following steps for each UE 312 competing for these resources to compute and apply respective Gap-Weight factors, as illustrated in FIG. 6. These steps correspond to steps 504 and 506 of FIG. 5.

The base station 302 determines whether the UE 312 has only uplink data to be transmitted and does not have any downlink data (step 600). If the UE 312 has only uplink data to be transmitted and does not have any downlink data, the RAN node 302 assigns a NULL Gap-Weight factor to this UE 312 (step 602).

Else, the base station 302 determines whether the UE 312 has only downlink data to be transmitted and does not have any uplink data and if the DL-UL gap requirement for the UE 312 (which is the DL-UL gap requirement for the downlink data (PDSCH) and HARQ feedback (PUCCH/PUSCH) for the UE 312) does not exceed K2 (minimum number of symbols needed between downlink transmission and HARQ feedback) (step 604). If so, the base station 302 assigns a NULL Gap-Weight factor to this UE 312 (step 606).

If the UE specific gap requirement exceeds K2, the base station 302 considers HARQ feedback as uplink data.

Else if the UE 312 has both downlink and uplink data:

The base station 302 determines whether the gap between downlink and uplink transmission resources being assigned to the UE 312 by the baseline scheduling procedure is larger than the DL-UL gap requirement for the UE 312 (step 608). If so, the base station 302 assigns NULL Gap-Weight factor to the UE 312 (step 610).

Else the base station 302 assigns a relative negative Gap-Weight factor to both downlink and uplink scheduling priority with an intent to lower the priority of UE 312 being assigned these transmission resources (step 612). UEs with larger DL-UL gap requirements are assigned larger negative factors with the intent to lower their priority relative to UEs with smaller DL-UL gap requirements.

In one alternate embodiment, the base station 302 assigns the same negative Gap-Weight factor to all such UEs irrespective of relative DL-UL gap requirements. See Variant-1 described below.

The base station 302 then adds the Gap-Weight factor computed for the UE 312 to the UE's priority metric to determine the final scheduling priority of the UE 312 (step 614). The UE 312 or a group of UEs 312 with the highest priority are scheduled in the given slot. This may result in a UE 312 that has been assigned resources in slot-x to be moved to slot-x+n. If the baseline scheduling procedure does not use a Waiting-Weight factor, a Waiting-Weight factor can be added to the overall priority metric to ensure that UEs 312 waiting longer have higher probability of getting scheduled in the next available slot. Note that a Waiting-Weight factor is a factor that increases the priority of a UE 312 the longer that UE 312 has been waiting to be scheduled.

The above scheduling procedure could be repeated iteratively to minimize any gap between downlink and uplink symbols at the air interface of the RAN node 302. For example:

If a UE-x has been assigned a set of symbols for uplink transmission but is not informed of the assigned resources yet and is triggered for downlink transmission, its priority metric for uplink transmission is recomputed along with the priority metric for downlink transmission using the Gap-Weight factors.

If the priority for uplink transmission changes as the result of re-computation of the priority metric, all UEs competing for uplink transmission are reevaluated.

If the reevaluation results in another UE being assigned these uplink symbols, the Gap-Weight factor for UE-x for both downlink and uplink may change.

Alternatively, the base station 302 may choose to leave the original uplink assignment as it is and only compute the scheduling priority of downlink transmission for UE-x and assign downlink resources to UE-x so that the probability of gap between downlink and uplink resources being greater than the DL-UL gap requirement is increased.

A similar approach may be taken if a UE 312 has been assigned a set of symbols for downlink transmission but is not informed of the assigned resources yet and is triggered for uplink transmission.

If UEs 312 have been allocated fixed uplink resources for control information (e.g., PUCCH for Scheduling Request (SR)), the base station 302 may assume that the UEs 312 would use these resources for transmission and use Variant-2

(see below) with uplink assignment fixed and downlink transmission scheduled in symbols to ensure gap between downlink and uplink resources exceeds the gap requirement for the given UE 312.

At the next scheduling opportunity, the base station 302 repeats the above process for the active UEs 312 competing for transmission resources.

The base station 302 may require a gap—generally 7 μs—at its air interface if it requires a switching time between downlink and uplink or it requires advance arrival of uplink data for processing or any other reason.

Some alternative embodiments will now be described.

Variant-1: In this embodiment, the base station 302 assigns same Gap-Weight factor to all UEs 312 having a gap between their downlink and uplink transmission resources that is less than the DL-UL gap requirements irrespective of the DL-UL gap requirements. After applying the Gap-Weight factor, if N (one or more) top ranked UEs require gap between downlink and uplink transmission, the base station 302 may then assign a weight based on the length of DL-UL gap requirement.

Variant-2: In this embodiment, the base station 302 fixes either downlink or uplink assignment and schedules the other according to the gap requirement of the respective UE 312. In one embodiment, the base station 302 first decides to allocate transmission resources for one direction, either downlink or uplink, and mark this decision as permanent. The base station 302 then computes the scheduling priority using the Gap-Weight factor computed for the UE 312 for the other direction.

Variant-3: In this embodiment, at each scheduling opportunity, the base station 302 (and in particular the scheduler) works only on a set of consecutive symbols (e.g., a slot or mini slot) consisting of either downlink or uplink transmission resources independently:

When assigning downlink transmission resources to a UE 312, the scheduler looks ahead to see if this UE 312 could be allocated uplink transmission resources in such a way that the gap between downlink transmission resources and the uplink transmission resources is less than the DL-UL gap requirements for this UE 312.

If yes, the scheduler applies a Gap-Weight factor to lower the priority of this UE 312 for both downlink and uplink transmission and checks other UEs.

Alternatively, the scheduler may modify the priority for only one direction as in Variant-2.

The scheduler continues until it finds a UE 312 that does not require additional gap or Algorithm-End is encountered.

The scheduler may apply a Waiting-Weight factor to all UEs 312 requiring transmission resources that are not being scheduled to ensure that UEs requiring gap don't starve.

Variant-4: In one embodiment, the base station 302 switch a UE's (UE-x) downlink assignment with another UE's (UE-y) downlink assignment where UE-y has been assigned downlink transmission resources after the uplink transmission resources assigned to UE-x. The effect is same that of applying a negative Gap-Weight to the downlink priority of UE-x to make it less than the downlink priority of UE-y. Similarly, the base station 302 could switch the uplink transmission resources between two UEs if a scheduling opportunity covers more than one uplink transmission resources.

Some final notes regarding the disclosed scheduling procedure are as follows. An end point—Algorithm-End—can be implemented to ensure that the scheduling procedure does not continue to iterate for long duration, e.g. number of iterations can be fixed.

The above scheduling procedure—or any variant of it—could be incorporated directly into the existing baseline scheduling procedure and does not need to be executed sequentially after the baseline scheduling procedure.

If the scheduling procedure ends up with a UE 312 being assigned consecutive downlink and uplink transmission resources (downlink followed by uplink), the scheduler ensures that the gap between downlink and uplink transmission resources is at least as large as the DL-UL gap requirement for that UE 312.

An example of the disclosed scheduling procedure is as follows. Consider a scheduler which uses a priority metric W for scheduling decision, where Wx refers to priority metric for UE-x. The priority metric consists of a number of factors including Waiting-Weight factor Fw, where Fw-x refers to the wait factor for UE-x.

In this example, there are four UEs competing for both downlink resource set $R_{dl}$ and uplink resource set $R_{ul}$. The priority metrics for these UEs excluding the Gap-Weight factors is Wn, where n=0 . . . 4. Further, for this example:

UE-1 has only downlink data to be transmitted,

UE-2 has only uplink data to transmit, and

UE-3 and UE-4 have both downlink and uplink data.

The priorities of these UEs without Gap-Weight factor are such that:

$$W_{dl\_4} > W_{dl\_3} > W_{dl\_1}, \text{ and}$$

$$W_{ul\_4} > W_{ul\_2} > W_{ul\_3}.$$

The gap requirements for these UEs are such that the gap requirement UE-4>the gap requirement for UE-3>the gap requirement for UE-2>the gap requirement for UE-1.

Figure 7A:
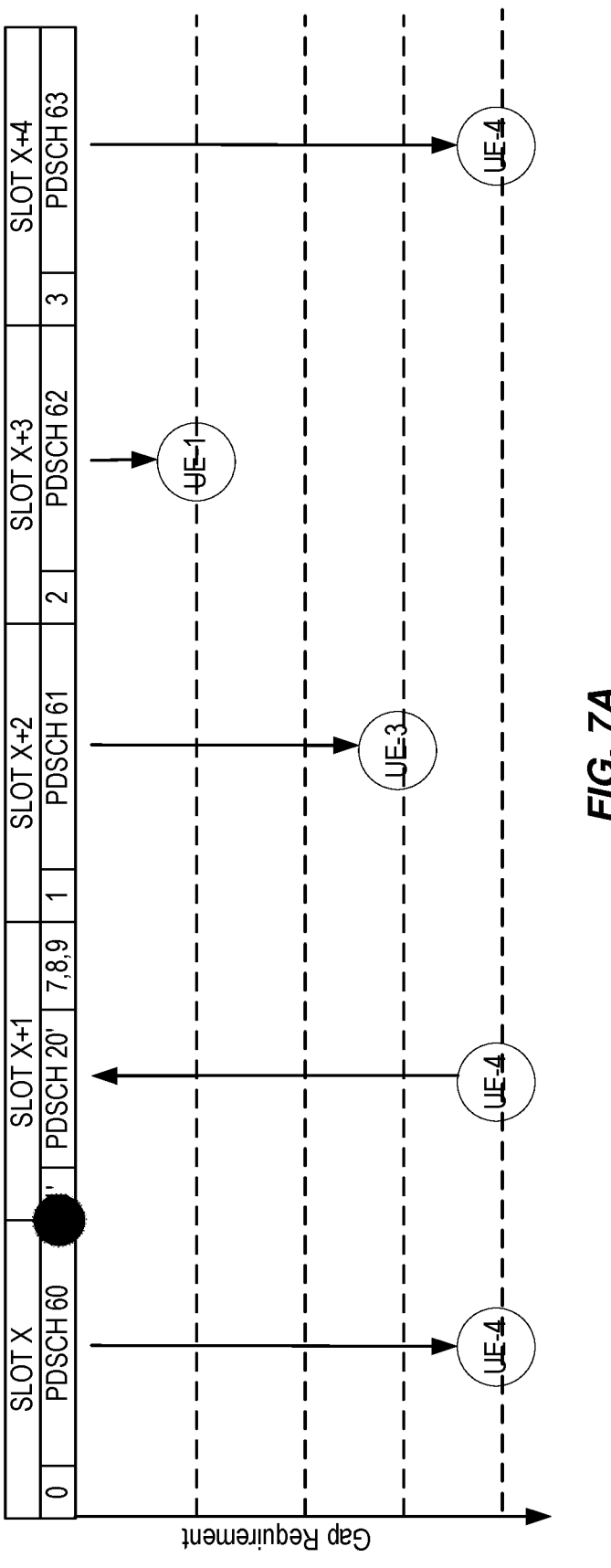
FIGS. 7A and 7B illustrates an original assignment for an example of one embodiment of the present disclosure.
Figure 7B:
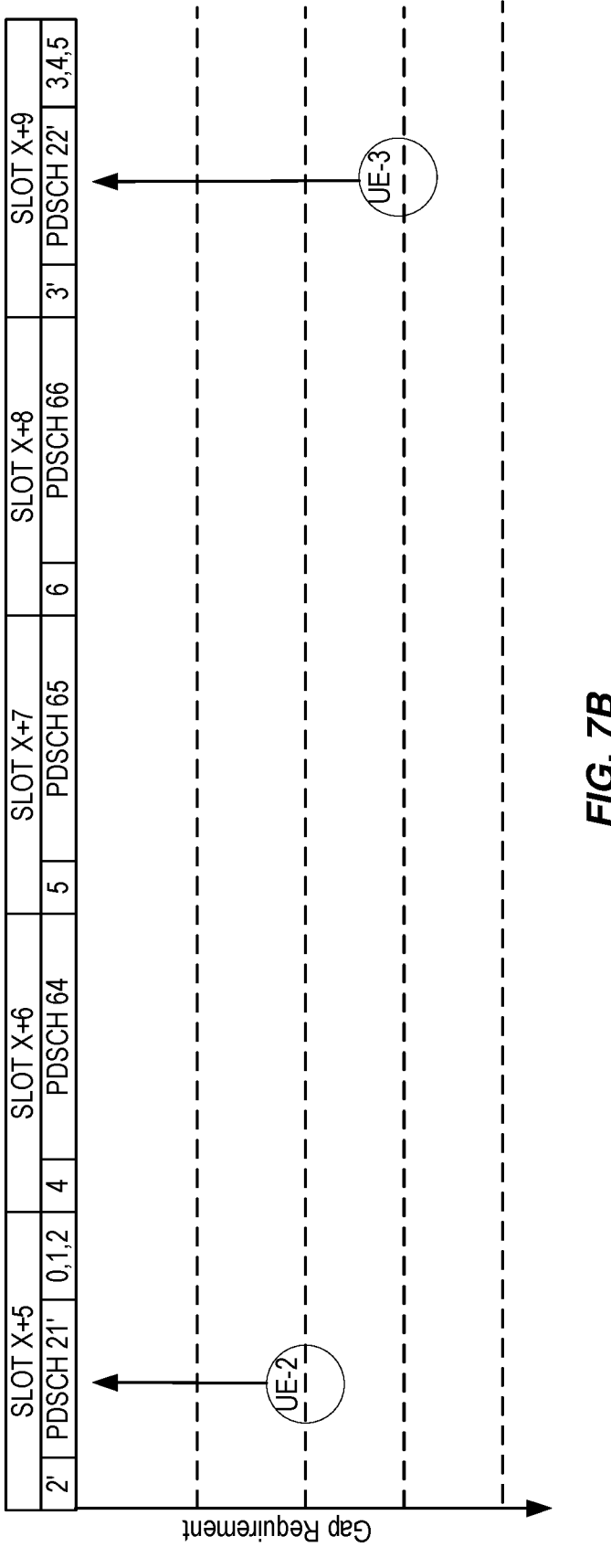

The original assignment for this example is illustrated in FIGS. 7A and 7B.

In the above example, UE-4 requires more than one slot worth of downlink resources. Since it has received the resources in slot-x, its priority for downlink goes down. UE-3 is given slot-x+2, and UE-1 is given slot-x+3. Then, it is UE-4's turn again for slot-x+5.

The above assignment requires a DL-UL gap between slot-x and slot-x+1.

The priorities are updated with Gap-Weight factors. The scheduler keeps the downlink assignment fixed and re-computes the uplink priority:

The priority of UE-1 and UE-2 remains unchanged as they have only downlink and only uplink data respectively.

The priority of UE-3 remains unchanged as gap between DL and UL is larger than the DL-UL gap requirements.

The priority of UE-4 is changed to $W_{dl\_4}$ and $W'_{ul\_4}$, where $W'_{ul\_4}$ is a new priority for uplink for UE-4.

New priority order for uplink is:

$$W_{ul\_2} > W_{ul\_4} > W_{ul\_3}.$$

Figure 8A:
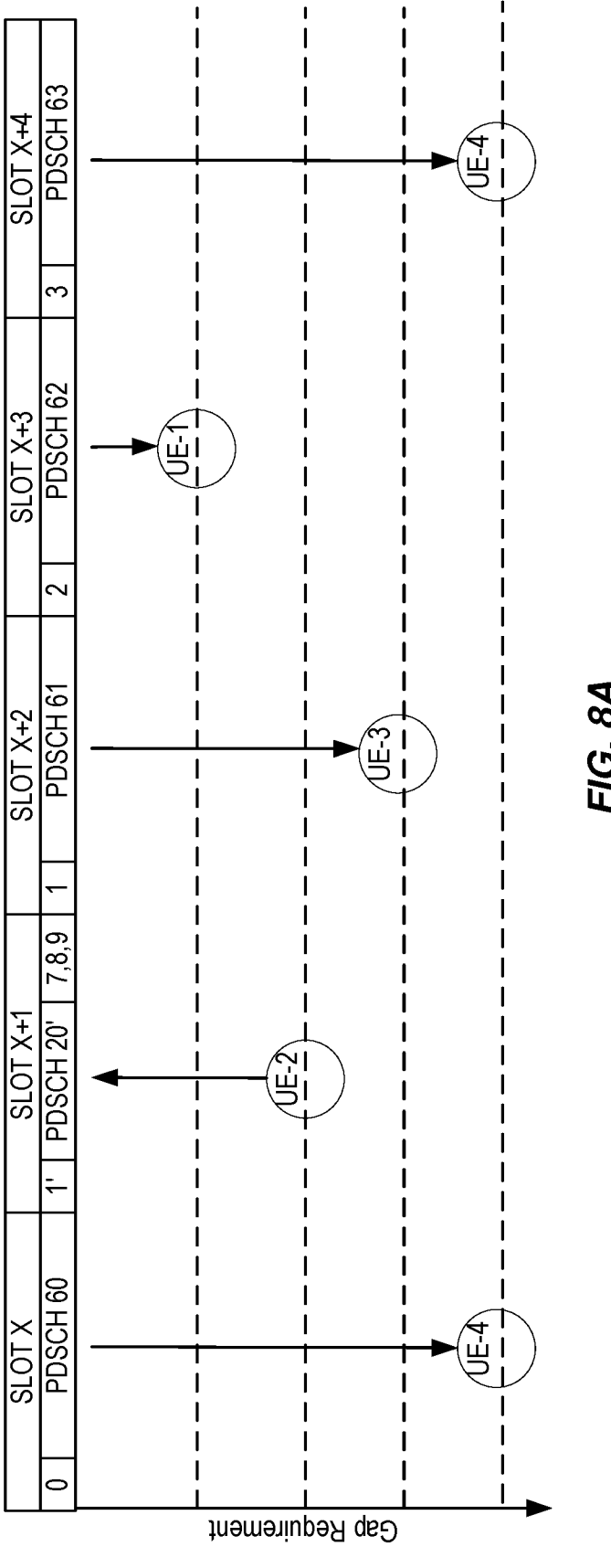
FIGS. 8A and 8B illustrates updated resource assignments for the example of one embodiment of the present disclosure.
Figure 8B:
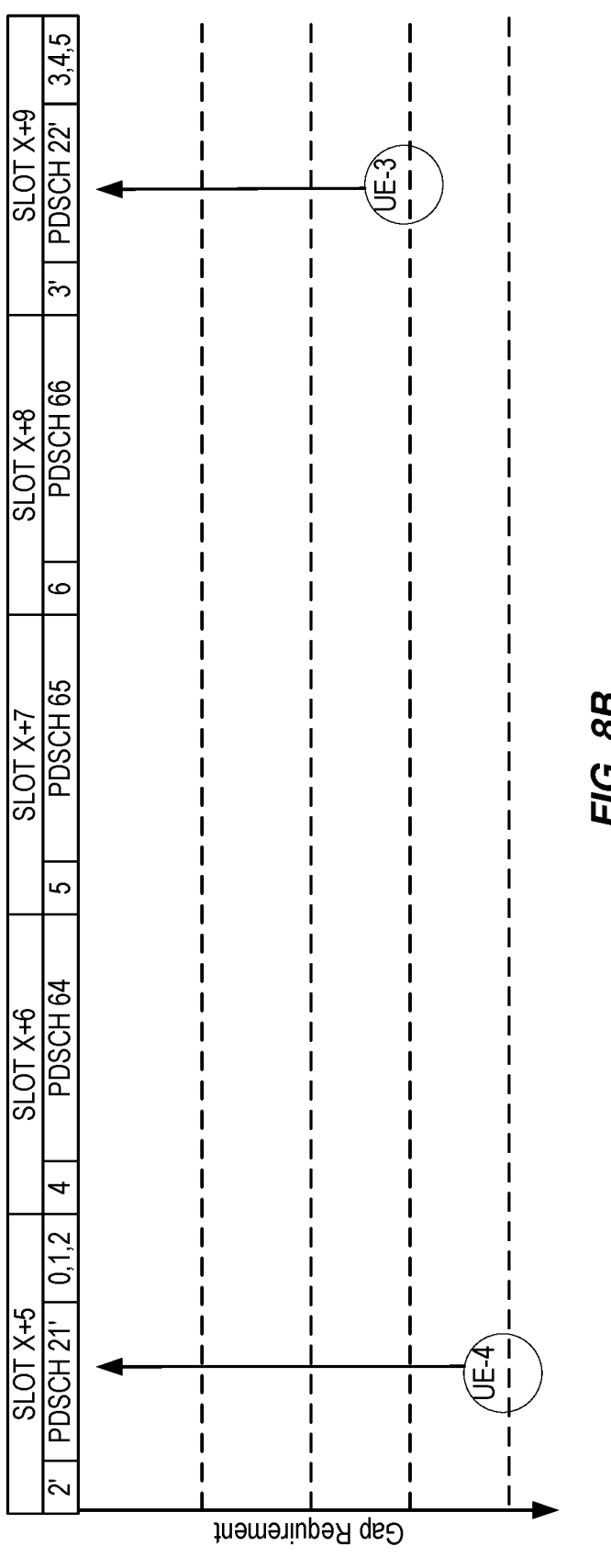

The scheduler then updates the transmission resource assignments as shown in FIGS. 8A and 8B.

Now, since two different UEs are scheduled in consecutive downlink and uplink symbols, no gap is needed between slot-x and slot-x+1.

Use of Waiting-Weight factor increases the probability that UE-4 is scheduled in slot-x+5 for uplink transmission even if more UEs get into the system requesting uplink resources.

Figure 9:
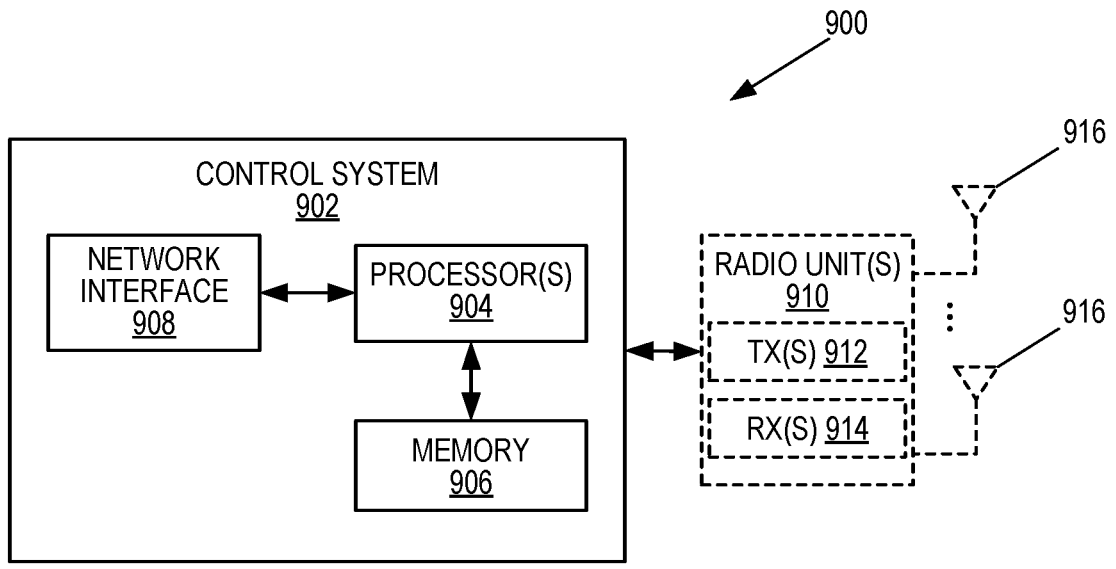
FIGS. 9, 10, and 11 are schematic block diagrams of example embodiments of a radio access node in which embodiments of the present disclosure may be implemented.

FIG. 9 is a schematic block diagram of a radio access node 900 according to some embodiments of the present disclosure. Optional features are represented by dashed boxes. The radio access node 900 may be, for example, a base station 302 or 306 or a network node that implements all or part of the functionality of the base station 302 described herein. As illustrated, the radio access node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. The one or more processors 904 are also referred to herein as processing circuitry. In addition, the radio access node 900 may include one or more radio units 910 that each includes one or more transmitters 912 and one or more receivers 914 coupled to one or more antennas 916. The radio units 910 may be referred to or be part of radio interface circuitry. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of a radio access node 900 as described herein. In some embodiments, the function(s) are implemented in software that is stored, e.g., in the memory 906 and executed by the one or more processors 904.

Figure 10:
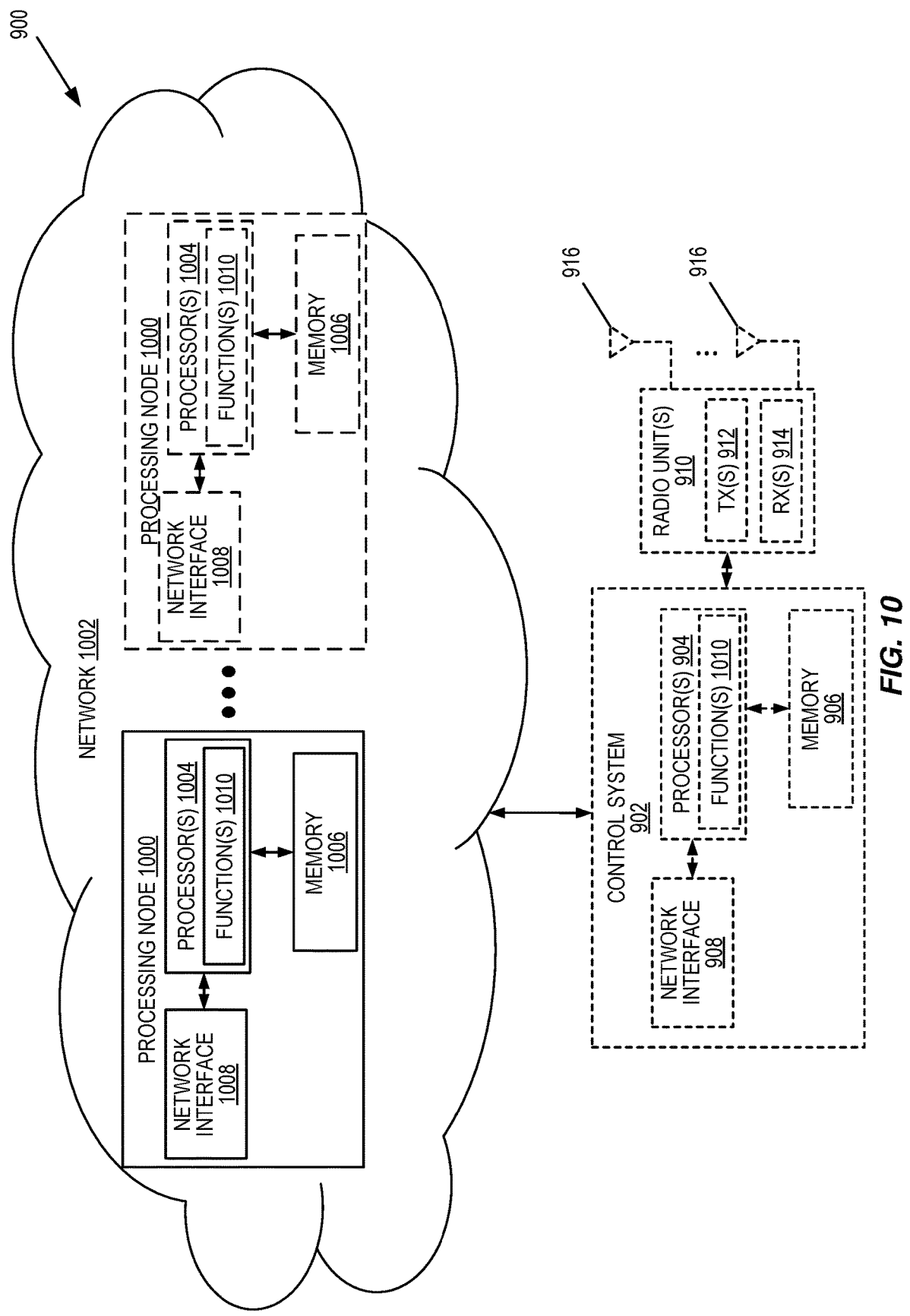

FIG. 10 is a schematic block diagram that illustrates a virtualized embodiment of the radio access node 900 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 900 in which at least a portion of the functionality of the radio access node 900 is implemented as a virtual component(s) (e.g., via a virtual machine(s) executing on a physical processing node(s) in a network(s)). As illustrated, in this example, the radio access node 900 may include the control system 902 and/or the one or more radio units 910, as described above. The control system 902 may be connected to the radio unit(s) 910 via, for example, an optical cable or the like. The radio access node 900 includes one or more processing nodes 1000 coupled to or included as part of a network(s) 1002. If present, the control system 902 or the radio unit(s) are connected to the processing node(s) 1000 via the network 1002. Each processing node 1000 includes one or more processors 1004 (e.g., CPUs, ASICs, FPGAs, and/or the like), memory 1006, and a network interface 1008.

In this example, functions 1010 of the radio access node 900 described herein are implemented at the one or more processing nodes 1000 or distributed across the one or more processing nodes 1000 and the control system 902 and/or the radio unit(s) 910 in any desired manner. In some particular embodiments, some or all of the functions 1010 of the radio access node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010. Notably, in some embodiments, the control system 902 may not be included, in which case the radio unit(s) 910 communicate directly with the processing node(s) 1000 via an appropriate network interface(s).

In some embodiments, a computer program including instructions which, when executed by at least one processor, causes the at least one processor to carry out the functionality of radio access node 900 or a node (e.g., a processing node 1000) implementing one or more of the functions 1010 of the radio access node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
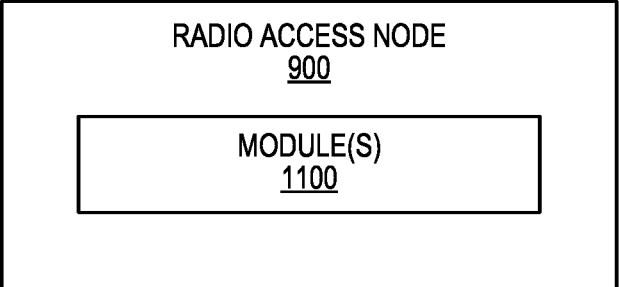

FIG. 11 is a schematic block diagram of the radio access node 900 according to some other embodiments of the present disclosure. The radio access node 900 includes one or more modules 1100, each of which is implemented in software. The module(s) 1100 provide the functionality of the radio access node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
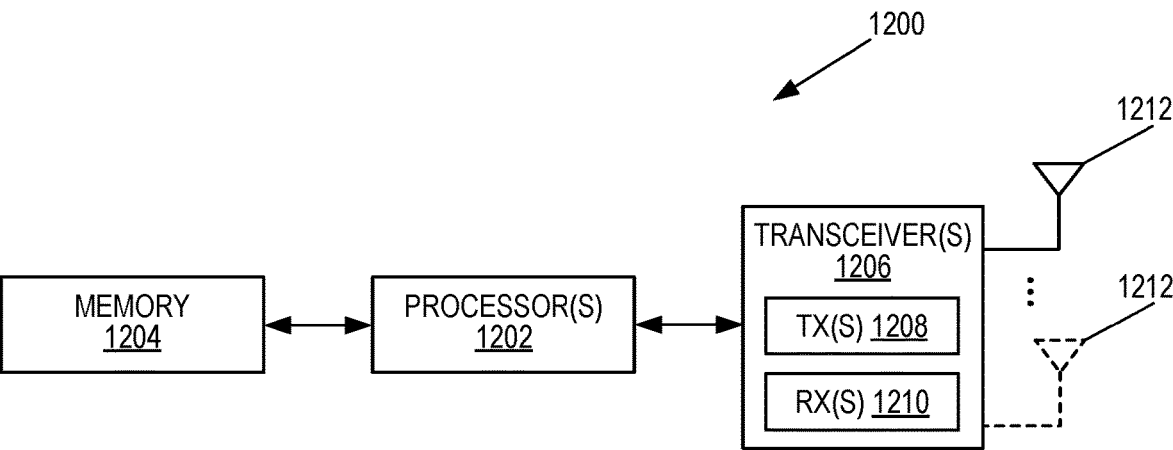
FIGS. 12 and 13 are schematic block diagrams of example embodiments of a wireless communication device, or User Equipment (UE)

FIG. 12 is a schematic block diagram of a wireless communication device 1200 according to some embodiments of the present disclosure. As illustrated, the wireless communication device 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. The transceiver(s) 1206 includes radio-front end circuitry connected to the antenna(s) 1212 that is configured to condition signals communicated between the antenna(s) 1212 and the processor(s) 1202, as will be appreciated by on of ordinary skill in the art. The processors 1202 are also referred to herein as processing circuitry. The transceivers 1206 are also referred to herein as radio circuitry. In some embodiments, the functionality of the wireless communication device 1200 described above may be fully or partially implemented in software that is, e.g., stored in the memory 1204 and executed by the processor(s) 1202. Note that the wireless communication device 1200 may include additional components not illustrated in FIG. 12 such as, e.g., one or more user interface components (e.g., an input/output interface including a display, buttons, a touch screen, a microphone, a speaker(s), and/or the like and/or any other components for allowing input of information into the wireless communication device 1200 and/or allowing output of information from the wireless communication device 1200), a power supply (e.g., a battery and associated power circuitry), etc.

In some embodiments, a computer program including instructions which, when executed by at least one processor, causes the at least one processor to carry out the functionality of the wireless communication device 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
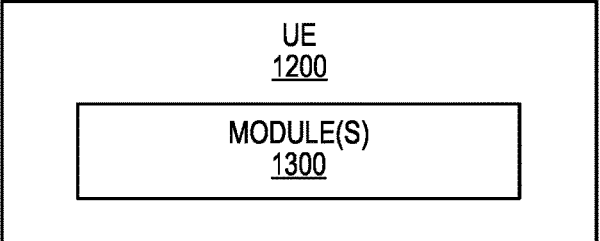

FIG. 13 is a schematic block diagram of the wireless communication device 1200 according to some other embodiments of the present disclosure. The wireless communication device 1200 includes one or more modules 1300, each of which is implemented in software. The module(s) 1300 provide the functionality of the wireless communication device 1200 described herein.

Figure 14:
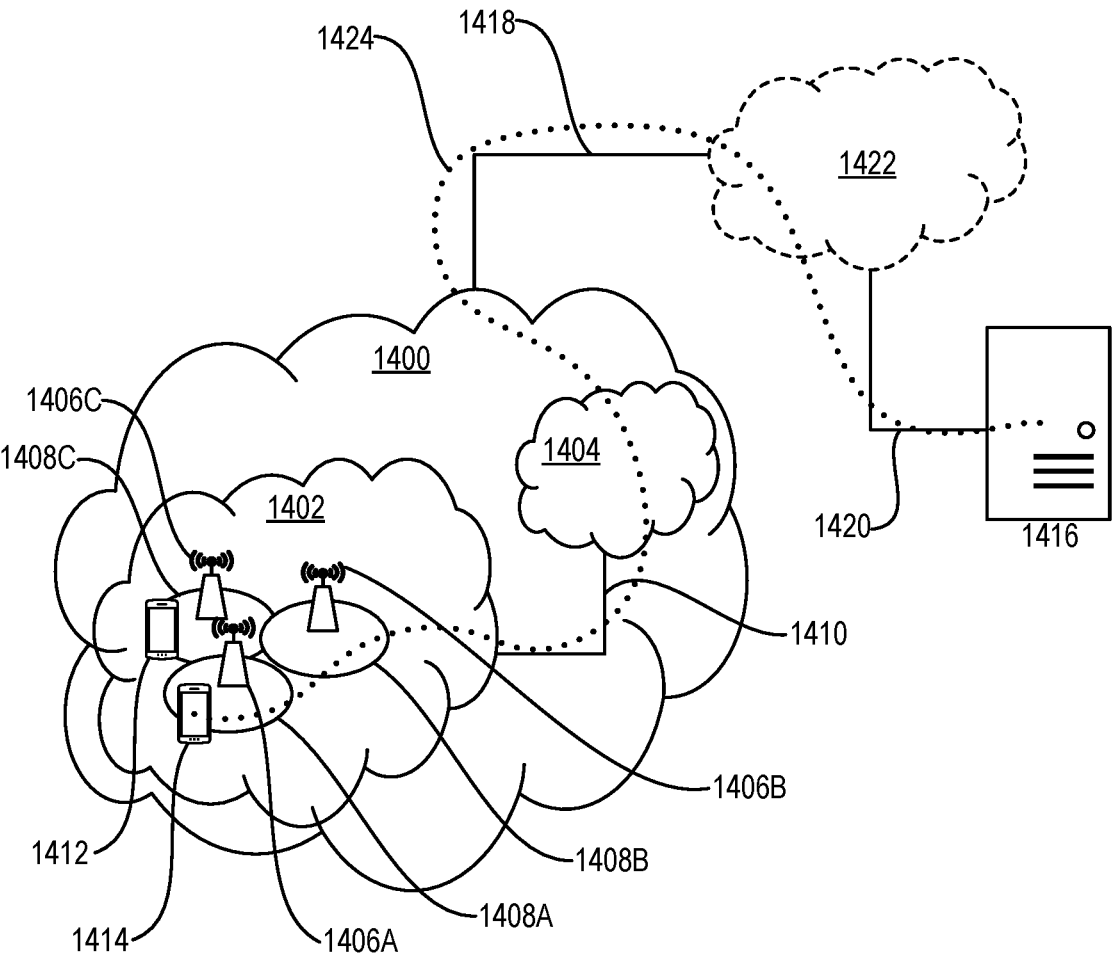
FIG. 14 illustrates another example of a system in which embodiments of the present disclosure may be implemented.

With reference to FIG. 14, in accordance with an embodiment, a communication system includes a telecommunication network 1400, such as a 3GPP-type cellular network, which comprises an access network 1402, such as a RAN, and a core network 1404. The access network 1402 comprises a plurality of base stations 1406A, 1406B, 1406C, such as Node Bs, eNBs, gNBs, or other types of wireless Access Points (APs), each defining a corresponding coverage area 1408A, 1408B, 1408C. Each base station 1406A, 1406B, 1406C is connectable to the core network 1404 over a wired or wireless connection 1410. A first UE 1412 located in coverage area 1408C is configured to wirelessly connect to, or be paged by, the corresponding base station 1406C. A second UE 1414 in coverage area 1408A is wirelessly connectable to the corresponding base station 1406A. While a plurality of UEs 1412, 1414 are illustrated in this example, the disclosed embodiments are equally applicable to a situation where a sole UE is in the coverage area or where a sole UE is connecting to the corresponding base station 1406.

The telecommunication network 1400 is itself connected to a host computer 1416, which may be embodied in the hardware and/or software of a standalone server, a cloud-implemented server, a distributed server, or as processing resources in a server farm. The host computer 1416 may be under the ownership or control of a service provider, or may be operated by the service provider or on behalf of the service provider. Connections 1418 and 1420 between the telecommunication network 1400 and the host computer 1416 may extend directly from the core network 1404 to the host computer 1416 or may go via an optional intermediate network 1422. The intermediate network 1422 may be one of, or a combination of more than one of, a public, private, or hosted network; the intermediate network 1422, if any, may be a backbone network or the Internet; in particular, the intermediate network 1422 may comprise two or more sub-networks (not shown).

The communication system of FIG. 14 as a whole enables connectivity between the connected UEs 1412, 1414 and the host computer 1416. The connectivity may be described as an Over-the-Top (OTT) connection 1424. The host computer 1416 and the connected UEs 1412, 1414 are configured to communicate data and/or signaling via the OTT connection 1424, using the access network 1402, the core network 1404, any intermediate network 1422, and possible further infrastructure (not shown) as intermediaries. The OTT connection 1424 may be transparent in the sense that the participating communication devices through which the OTT connection 1424 passes are unaware of routing of uplink and downlink communications. For example, the base station 1406 may not or need not be informed about the past routing of an incoming downlink communication with data originating from the host computer 1416 to be forwarded (e.g., handed over) to a connected UE 1412. Similarly, the base station 1406 need not be aware of the future routing of an outgoing uplink communication originating from the UE 1412 towards the host computer 1416.

Example implementations, in accordance with an embodiment, of the UE, base station, and host computer discussed in the preceding paragraphs will now be described with reference to FIG. 15. In a communication system 1500, a host computer 1502 comprises hardware 1504 including a communication interface 1506 configured to set up and maintain a wired or wireless connection with an interface of a different communication device of the communication system 1500. The host computer 1502 further comprises processing circuitry 1508, which may have storage and/or processing capabilities. In particular, the processing circuitry 1508 may comprise one or more programmable processors, ASICs, FPGAs, or combinations of these (not shown) adapted to execute instructions. The host computer 1502 further comprises software 1510, which is stored in or accessible by the host computer 1502 and executable by the processing circuitry 1508. The software 1510 includes a host application 1512. The host application 1512 may be operable to provide a service to a remote user, such as a UE 1514 connecting via an OTT connection 1516 terminating at the UE 1514 and the host computer 1502. In providing the service to the remote user, the host application 1512 may provide user data which is transmitted using the OTT connection 1516.

The communication system 1500 further includes a base station 1518 provided in a telecommunication system and comprising hardware 1520 enabling it to communicate with the host computer 1502 and with the UE 1514. The hardware 1520 may include a communication interface 1522 for setting up and maintaining a wired or wireless connection with an interface of a different communication device of the communication system 1500, as well as a radio interface 1524 for setting up and maintaining at least a wireless connection 1526 with the UE 1514 located in a coverage area (not shown in FIG. 15) served by the base station 1518. The communication interface 1522 may be configured to facilitate a connection 1528 to the host computer 1502. The connection 1528 may be direct or it may pass through a core network (not shown in FIG. 15) of the telecommunication system and/or through one or more intermediate networks outside the telecommunication system. In the embodiment shown, the hardware 1520 of the base station 1518 further includes processing circuitry 1530, which may comprise one or more programmable processors, ASICs, FPGAs, or combinations of these (not shown) adapted to execute instructions. The base station 1518 further has software 1532 stored internally or accessible via an external connection.

The communication system 1500 further includes the UE 1514 already referred to. The UE's 1514 hardware 1534 may include a radio interface 1536 configured to set up and maintain a wireless connection 1526 with a base station serving a coverage area in which the UE 1514 is currently located. The hardware 1534 of the UE 1514 further includes processing circuitry 1538, which may comprise one or more programmable processors, ASICs, FPGAs, or combinations of these (not shown) adapted to execute instructions. The UE 1514 further comprises software 1540, which is stored in or accessible by the UE 1514 and executable by the processing circuitry 1538. The software 1540 includes a client application 1542. The client application 1542 may be operable to provide a service to a human or non-human user via the UE 1514, with the support of the host computer 1502. In the host computer 1502, the executing host application 1512 may communicate with the executing client application 1542 via the OTT connection 1516 terminating at the UE 1514 and the host computer 1502. In providing the service to the user, the client application 1542 may receive request data from the host application 1512 and provide user data in response to the request data. The OTT connection 1516 may transfer both the request data and the user data. The client application 1542 may interact with the user to generate the user data that it provides.

Figure 15:
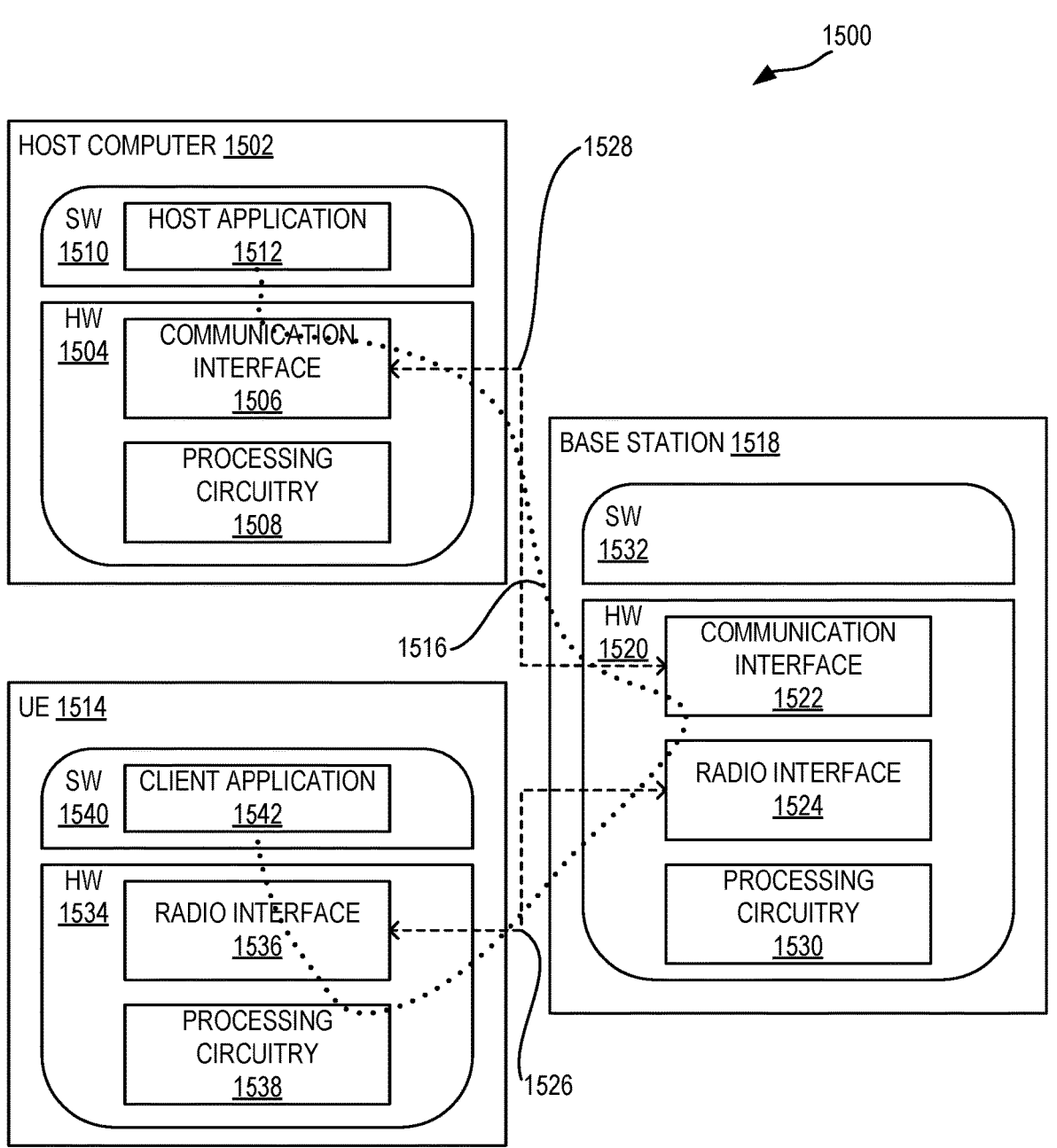
FIG. 15 illustrates example embodiments of the host computer, base station, and UE of FIG. 14.

It is noted that the host computer 1502, the base station 1518, and the UE 1514 illustrated in FIG. 15 may be similar or identical to the host computer 1416, one of the base stations 1406A, 1406B, 1406C, and one of the UEs 1412, 1414 of FIG. 14, respectively. This is to say, the inner workings of these entities may be as shown in FIG. 15 and independently, the surrounding network topology may be that of FIG. 14.

In FIG. 15, the OTT connection 1516 has been drawn abstractly to illustrate the communication between the host computer 1502 and the UE 1514 via the base station 1518 without explicit reference to any intermediary devices and the precise routing of messages via these devices. The network infrastructure may determine the routing, which may be configured to hide from the UE 1514 or from the service provider operating the host computer 1502, or both. While the OTT connection 1516 is active, the network infrastructure may further take decisions by which it dynamically changes the routing (e.g., on the basis of load balancing consideration or reconfiguration of the network).

The wireless connection 1526 between the UE 1514 and the base station 1518 is in accordance with the teachings of the embodiments described throughout this disclosure. One or more of the various embodiments improve the performance of OTT services provided to the UE 1514 using the OTT connection 1516, in which the wireless connection 1526 forms the last segment. More precisely, the teachings of these embodiments may improve, e.g., throughput and thereby provide benefits such as, e.g., reduced user waiting time, relaxed restriction on file size, and/or better responsiveness.

A measurement procedure may be provided for the purpose of monitoring data rate, latency, and other factors on which the one or more embodiments improve. There may further be an optional network functionality for reconfiguring the OTT connection 1516 between the host computer 1502 and the UE 1514, in response to variations in the measurement results. The measurement procedure and/or the network functionality for reconfiguring the OTT connection 1516 may be implemented in the software 1510 and the hardware 1504 of the host computer 1502 or in the software 1540 and the hardware 1534 of the UE 1514, or both. In some embodiments, sensors (not shown) may be deployed in or in association with communication devices through which the OTT connection 1516 passes; the sensors may participate in the measurement procedure by supplying values of the monitored quantities exemplified above, or supplying values of other physical quantities from which the software 1510, 1540 may compute or estimate the monitored quantities. The reconfiguring of the OTT connection 1516 may include message format, retransmission settings, preferred routing, etc.; the reconfiguring need not affect the base station 1518, and it may be unknown or imperceptible to the base station 1518. Such procedures and functionalities may be known and practiced in the art. In certain embodiments, measurements may involve proprietary UE signaling facilitating the host computer 1502's measurements of throughput, propagation times, latency, and the like. The measurements may be implemented in that the software 1510 and 1540 causes messages to be transmitted, in particular empty or 'dummy' messages, using the OTT connection 1516 while it monitors propagation times, errors, etc.

Figures 16, 17:
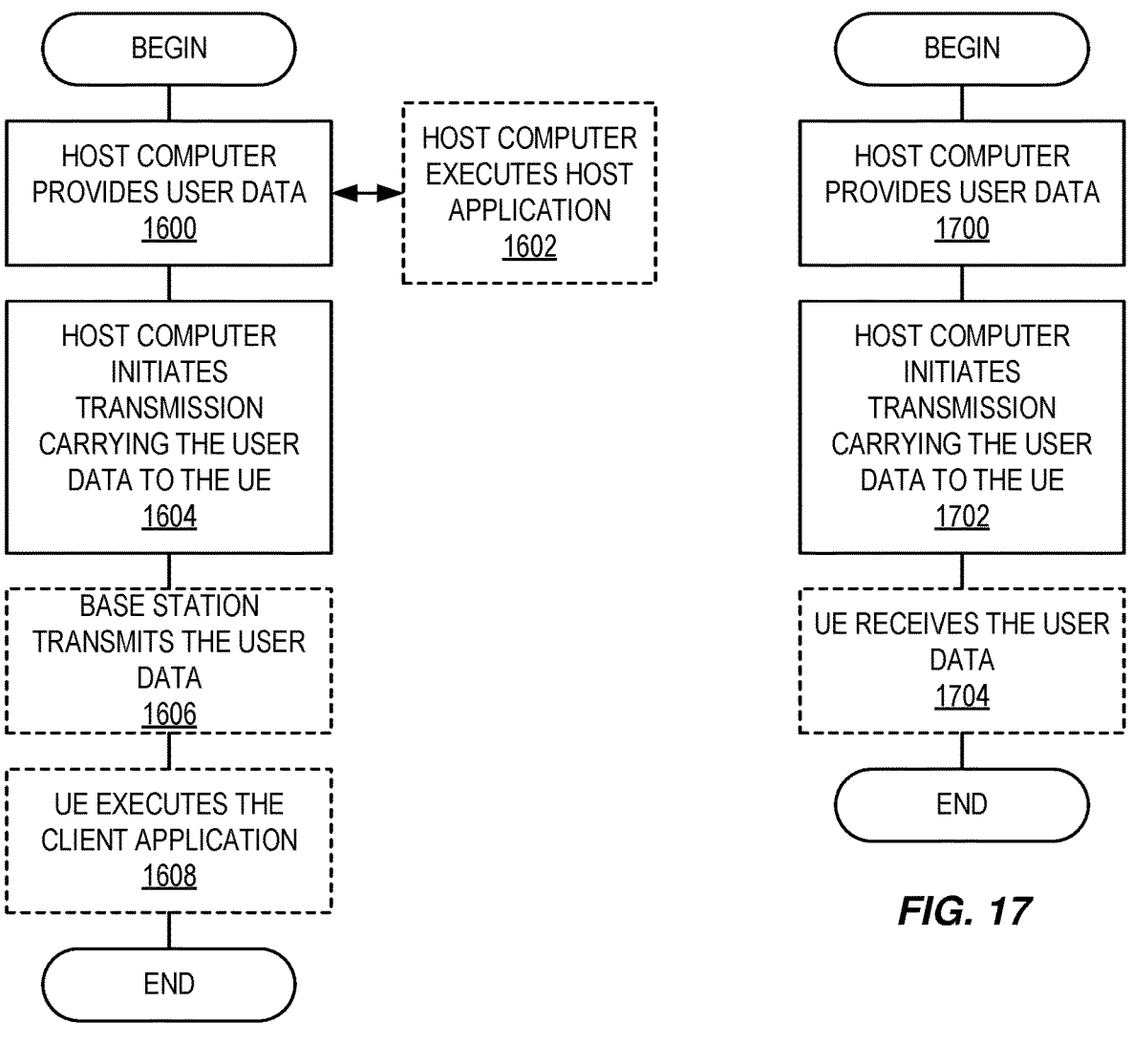
FIGS. 16, 17, 18, and 19 are flow chart that illustrate example processes within the system of FIG. 14 in accordance with embodiments of the present disclosure.

FIG. 16 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 16 will be included in this section. In step 1600, the host computer provides user data. In sub-step 1602 (which may be optional) of step 1600, the host computer provides the user data by executing a host application. In step 1604, the host computer initiates a transmission carrying the user data to the UE. In step 1606 (which may be optional), the base station transmits to the UE the user data which was carried in the transmission that the host computer initiated, in accordance with the teachings of the embodiments described throughout this disclosure. In step 1608 (which may also be optional), the UE executes a client application associated with the host application executed by the host computer.

FIG. 17 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 17 will be included in this section. In step 1700 of the method, the host computer provides user data. In an optional sub-step (not shown) the host computer provides the user data by executing a host application. In step 1702, the host computer initiates a transmission carrying the user data to the UE. The transmission may pass via the base station, in accordance with the teachings of the embodiments described throughout this disclosure. In step 1704 (which may be optional), the UE receives the user data carried in the transmission.

Figures 18, 19:
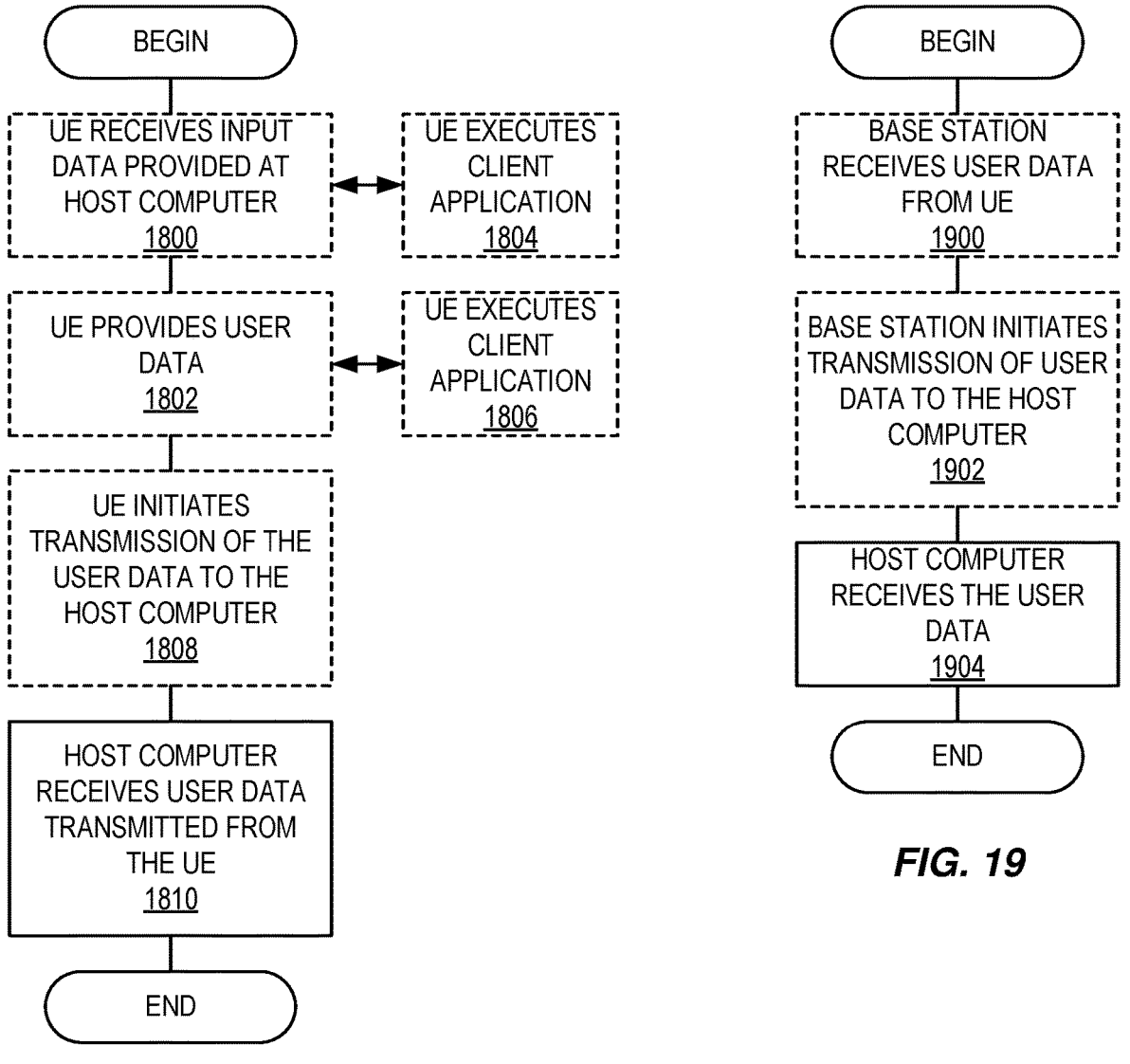

FIG. 18 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 18 will be included in this section. In step 1800 (which may be optional), the UE receives input data provided by the host computer. Additionally or alternatively, in step 1802, the UE provides user data. In sub-step 1804 (which may be optional) of step 1800, the UE provides the user data by executing a client application. In sub-step 1806 (which may be optional) of step 1802, the UE executes a client application which provides the user data in reaction to the received input data provided by the host computer. In providing the user data, the executed client application may further consider user input received from the user. Regardless of the specific manner in which the user data was provided, the UE initiates, in sub-step 1808 (which may be optional), transmission of the user data to the host computer. In step 1810 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 19 will be included in this section. In step 1900 (which may be optional), in accordance with the teachings of the embodiments described throughout this disclosure, the base station receives user data from the UE. In step 1902 (which may be optional), the base station initiates transmission of the received user data to the host computer. In step 1904 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a base station (302) for scheduling downlink and/or uplink transmissions to a plurality of wireless communication devices (312) in a Time-Division Duplexing, TDD, system, the method comprising: obtaining (402) a path delay requirement or requirements (e.g., timing advance requirements) of a plurality of wireless communication devices (312); determining (404) downlink-to-uplink gap requirements of the plurality of wireless communication devices (312) based on the path delay requirements of the plurality of wireless communication devices (312); and performing (406) scheduling for the plurality of wireless communication devices (312) based on the downlink-to-uplink gap requirements of the plurality of wireless communication devices (312).

Embodiment 2: The method of embodiment 1 wherein performing (406) scheduling for the plurality of wireless communication devices (312) based on the downlink-to-uplink gap requirements of the plurality of wireless communication devices (312) comprises performing (406) scheduling for the plurality of wireless communication devices (312) based on the downlink-to-uplink gap requirements of the plurality of wireless communication devices (312) such that the downlink-to-uplink gap requirements of the plurality of wireless communication devices (312) are satisfied.

Embodiment 3: The method of embodiment 1 or 2 wherein performing (406) scheduling for the plurality of wireless communication devices (312) based on the downlink-to-uplink gap requirements of the plurality of wireless communication devices (312) comprises assigning transmission resources that fall between downlink transmissions resources assigned for a particular wireless communication device (312) and uplink transmission resources assigned for the particular wireless communication device (312) are assigned for downlink transmission to or uplink transmission from another wireless communication device (312).

Embodiment 4: The method of any of embodiments 1 to 3 wherein performing (406) scheduling for the plurality of wireless communication devices (312) based on the downlink-to-uplink gap requirements of the plurality of wireless communication devices (312) comprises:

performing (500) a baseline scheduling procedure that assigns transmission resources and scheduling priorities to a subset of the plurality of wireless communication devices (312);

for each wireless communication device (312) from among at least one of the subset of the plurality of wireless communication devices (312):

computing (504) a gap weight factor for the wireless communication device (312) based on the downlink-to-uplink requirement of the wireless communication device (312); and computing (506) a new scheduling priority for the wireless communication device (312) based on the scheduling priority assigned to the wireless communication device (312) by the baseline scheduling procedure and the gap weight factor computed for the wireless communication device (312);

reassigning (508) transmission resources based on the new scheduling priority computed for the at least one of the subset of the plurality of wireless communication devices (312).

Embodiment 5: The method of embodiment 4 wherein computing (504) the gap weight factor for the wireless communication device (312) comprises: determining (600) that that the wireless communication device (312) has only uplink data and no downlink data; and setting (602) the gap weight factor to null responsive to determining (600) that that the wireless communication device (312) has only uplink data and no downlink data.

Embodiment 6: The method of embodiment 4 wherein computing (504) the gap weight factor for the wireless communication device (312) comprises: determining (604) that that the wireless communication device (312) has only downlink data and no uplink data and that the downlink-to-uplink gap requirement of the wireless communication device (312) does not exceed a minimum number of symbols needed between downlink transmission and HARQ feedback; and setting (606) the gap weight factor to null responsive to determining (604) that that the wireless communication device (312) has only downlink data and no uplink data and that the downlink-to-uplink gap requirement of the wireless communication device (312) does not exceed the minimum number of symbols needed between downlink transmission and HARQ feedback.

Embodiment 7: The method of embodiment 4 wherein computing (504) the gap weight factor for the wireless communication device (312) comprises: determining (600, NO and 604, NO) that that the wireless communication device (312) has both downlink data and uplink; determining (608) that a scheduled gap between downlink transmission resources and uplink transmission resources assigned to the wireless communication device (312) by the baseline scheduling procedure is greater than the downlink-to-uplink gap requirement of the wireless communication device (312); and setting (610) the gap weight factor to null responsive to determining (600, NO and 604, NO) that that the wireless communication device (312) has both downlink data and uplink and determining (608) that the scheduled gap between downlink transmission resources and uplink transmission resources assigned to the wireless communication device (312) by the baseline scheduling procedure is greater than the downlink-to-uplink gap requirement of the wireless communication device (312).

Embodiment 8: The method of embodiment 4 wherein computing (504) the gap weight factor for the wireless communication device (312) comprises: determining (600, NO and 604, NO) that that the wireless communication device (312) has both downlink data and uplink; determining (608) that a scheduled gap between downlink transmission resources and uplink transmission resources assigned to the wireless communication device (312) by the baseline scheduling procedure is not greater than the downlink-to-uplink gap requirement of the wireless communication device (312); and assigning (612) a negative gap weight factor as the gap weight factor of the wireless communication device (312) responsive to determining (600, NO and 604, NO) that that the wireless communication device (312) has both downlink data and uplink and determining (608) that the scheduled gap between downlink transmission resources and uplink transmission resources assigned to the wireless communication device (312) by the baseline scheduling procedure is not greater than the downlink-to-uplink gap requirement of the wireless communication device (312).

Embodiment 9: The method of embodiment 8 wherein the negative gap weight factor is relative to the downlink-to-uplink gap requirement of the wireless communication device (312).

Embodiment 10: The method of embodiment 8 wherein the negative gap weight factor is a fixed value.

Embodiment 11: The method of any of embodiments 8 to 10 wherein the negative gap weight value is applicable to both downlink and uplink transmission for the wireless communication device (312).

Embodiment 12: The method of any of embodiments 8 to 10 wherein the negative gap weight value is applicable to downlink transmission but not uplink transmission for the wireless communication device (312).

Embodiment 13: The method of any of embodiments 8 to 10 wherein the negative gap weight value is applicable to uplink transmission but not downlink transmission for the wireless communication device (312).

Embodiment 14: The method of any of embodiments 1 to 11 wherein performing (406) scheduling for the plurality of wireless communication devices (312) based on the downlink-to-uplink gap requirements of the plurality of wireless communication devices (312) comprises performing (406) scheduling for the plurality of wireless communication devices (312) such that the downlink-to-uplink gap requirements of the plurality of wireless communication devices (312) are taken into consideration for scheduling of uplink transmissions but not downlink transmissions.

Embodiment 15: The method of any of embodiments 1 to 11 wherein performing (406) scheduling for the plurality of wireless communication devices (312) based on the downlink-to-uplink gap requirements of the plurality of wireless communication devices (312) comprises performing (406) scheduling for the plurality of wireless communication devices (312) such that the downlink-to-uplink gap requirements of the plurality of wireless communication devices (312) are taken into consideration for scheduling of downlink transmissions but not uplink transmissions.

Embodiment 16: The method of any of the previous embodiments, further comprising: obtaining user data; and forwarding the user data to a host computer or a wireless device.

Group B Embodiments

Embodiment 17: A base station comprising: processing circuitry configured to perform any of the steps of any of the Group A embodiments; and power supply circuitry configured to supply power to the base station.

Embodiment 18: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group A embodiments.

Embodiment 19: The communication system of the previous embodiment further including the base station.

Embodiment 20: The communication system of the previous 2 embodiments, further including the UE, wherein the UE is configured to communicate with the base station.

Embodiment 21: The communication system of the previous 3 embodiments, wherein: the processing circuitry of the host computer is configured to execute a host application, thereby providing the user data; and the UE comprises processing circuitry configured to execute a client application associated with the host application.

Embodiment 22: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group A embodiments.

Embodiment 23: The method of the previous embodiment, further comprising, at the base station, transmitting the user data.

Embodiment 24: The method of the previous 2 embodiments, wherein the user data is provided at the host computer by executing a host application, the method further comprising, at the UE, executing a client application associated with the host application.

Embodiment 25: A User Equipment, UE, configured to communicate with a base station, the UE comprising a radio interface and processing circuitry configured to perform the method of the previous 3 embodiments.

Embodiment 26: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group A embodiments.

Embodiment 27: The communication system of the previous embodiment further including the base station.

Embodiment 28: The communication system of the previous 2 embodiments, further including the UE, wherein the UE is configured to communicate with the base station.

Embodiment 29: The communication system of the previous 3 embodiments, wherein: the processing circuitry of the host computer is configured to execute a host application; and the UE is configured to execute a client application associated with the host application, thereby providing the user data to be received by the host computer.

Those skilled in the art will recognize improvements and modifications to the embodiments of the present disclosure. All such improvements and modifications are considered within the scope of the concepts disclosed herein.

The invention claimed is:

1. A method performed by a network node for scheduling downlink and/or uplink transmissions to a plurality of wireless communication devices in a Time-Division Duplexing, TDD, system, the method comprising:
   obtaining path delay requirements of a plurality of wireless communication devices;
   determining downlink-to-uplink gap requirements of the plurality of wireless communication devices based on the path delay requirements of the plurality of wireless communication devices; and
   performing scheduling for the plurality of wireless communication devices based on the downlink-to-uplink gap requirements of the plurality of wireless communication devices, wherein performing scheduling for the plurality of wireless communication devices based on the downlink-to-uplink gap requirements of the plurality of wireless communication devices comprises:
      performing a baseline scheduling procedure that assigns transmission resources and scheduling priorities to a subset of the plurality of wireless communication devices;
      for each wireless communication device from among at least one of the subset of the plurality of wireless communication devices:
         computing a gap weight factor for the wireless communication device based on the downlink-to-uplink requirement of the wireless communication device; and
         computing a new scheduling priority for the wireless communication device based on a scheduling priority assigned to the wireless communication device by the baseline scheduling procedure and the gap weight factor computed for the wireless communication device; and
      reassigning transmission resources based on the new scheduling priority computed for the at least one of the subset of the plurality of wireless communication devices.

2. The method of claim 1 wherein performing scheduling for the plurality of wireless communication devices based on the downlink-to-uplink gap requirements of the plurality of wireless communication devices comprises performing scheduling for the plurality of wireless communication devices based on the downlink-to-uplink gap requirements of the plurality of wireless communication devices such that the downlink-to-uplink gap requirements of the plurality of wireless communication devices are satisfied.

3. The method of claim 1 wherein performing scheduling for the plurality of wireless communication devices based on the downlink-to-uplink gap requirements of the plurality of wireless communication devices comprises assigning transmission resources that fall between downlink transmissions resources assigned for a particular wireless communication device and uplink transmission resources assigned for the particular wireless communication device for downlink transmission to or uplink transmission from another wireless communication device.

4. The method of claim 1 wherein computing the gap weight factor for the wireless communication device comprises:
   determining that the wireless communication device has only uplink data and no downlink data; and
   setting the gap weight factor to null responsive to determining that the wireless communication device has only uplink data and no downlink data.

5. The method of claim 1 wherein computing the gap weight factor for the wireless communication device comprises:
   determining that the wireless communication device has only downlink data and no uplink data and that the downlink-to-uplink gap requirement of the wireless communication device does not exceed a minimum number of symbols needed between downlink transmission and HARQ feedback; and
   setting the gap weight factor to null responsive to determining that the wireless communication device has only downlink data and no uplink data and that the downlink-to-uplink gap requirement of the wireless communication device does not exceed the minimum number of symbols needed between downlink transmission and HARQ feedback.

6. The method of claim 1 wherein computing the gap weight factor for the wireless communication device comprises:
   determining that the wireless communication device has both downlink data and uplink;
   determining that a scheduled gap between downlink transmission resources and uplink transmission resources assigned to the wireless communication device by the baseline scheduling procedure is greater than the downlink-to-uplink gap requirement of the wireless communication device; and
   setting the gap weight factor to null responsive to determining that the wireless communication device has both downlink data and uplink and determining that the scheduled gap between downlink transmission resources and uplink transmission resources assigned to the wireless communication device by the baseline scheduling procedure is greater than the downlink-to-uplink gap requirement of the wireless communication device.

7. The method of claim 1 wherein computing the gap weight factor for the wireless communication device comprises:
   determining that the wireless communication device has both downlink data and uplink;
   determining that a scheduled gap between downlink transmission resources and uplink transmission resources assigned to the wireless communication device by the baseline scheduling procedure is not greater than the downlink-to-uplink gap requirement of the wireless communication device; and
   assigning a negative gap weight factor as the gap weight factor of the wireless communication device responsive to determining that the wireless communication device has both downlink data and uplink and determining that the scheduled gap between downlink transmission resources and uplink transmission resources assigned to the wireless communication device by the baseline scheduling procedure is not greater than the downlink-to-uplink gap requirement of the wireless communication device.

8. The method of claim 7 wherein the negative gap weight factor is relative to the downlink-to-uplink gap requirement of the wireless communication device.

9. The method of claim 7 wherein the negative gap weight factor is a fixed value.

10. The method of claim 7 wherein the negative gap weight value is applicable to both downlink and uplink transmission for the wireless communication device.

11. The method of claim 7 wherein the negative gap weight value is applicable to downlink transmission but not uplink transmission for the wireless communication device.

12. The method of claim 7 wherein the negative gap weight value is applicable to uplink transmission but not downlink transmission for the wireless communication device.

13. The method of claim 1 wherein performing scheduling for the plurality of wireless communication devices based on the downlink-to-uplink gap requirements of the plurality of wireless communication devices comprises performing scheduling for the plurality of wireless communication devices such that the downlink-to-uplink gap requirements of the plurality of wireless communication devices are taken into consideration for scheduling of uplink transmissions but not downlink transmissions.

14. The method of claim 1 wherein performing scheduling for the plurality of wireless communication devices based on the downlink-to-uplink gap requirements of the plurality of wireless communication devices comprises performing scheduling for the plurality of wireless communication devices such that the downlink-to-uplink gap requirements of the plurality of wireless communication devices are taken into consideration for scheduling of downlink transmissions but not uplink transmissions.

15. A network node for scheduling downlink and/or uplink transmissions to a plurality of wireless communication devices in a Time-Division Duplexing, TDD, system, the network node comprising processing circuitry configured to cause the network node to:

obtain path delay requirements of a plurality of wireless communication devices;

determine downlink-to-uplink gap requirements of the plurality of wireless communication devices based on the path delay requirements of the plurality of wireless communication devices; and perform scheduling for the plurality of wireless communication devices based on the downlink-to-uplink gap requirements of the plurality of wireless communication devices, wherein performing scheduling for the plurality of wireless communication devices based on the downlink-to-uplink gap requirements of the plurality of wireless communication devices comprises:

performing a baseline scheduling procedure that assigns transmission resources and scheduling priorities to a subset of the plurality of wireless communication devices;

for each wireless communication device from among at least one of the subset of the plurality of wireless communication devices:

computing a gap weight factor for the wireless communication device based on the downlink-to-uplink requirement of the wireless communication device; and computing a new scheduling priority for the wireless communication device based on a scheduling priority assigned to the wireless communication device by the baseline scheduling procedure and the gap weight factor computed for the wireless communication device; and reassigning transmission resources based on the new scheduling priority computed for the at least one of the subset of the plurality of wireless communication devices.

* * * * *